US012560478B2

(12) United States Patent
Moriyama et al.

(10) Patent No.: US 12,560,478 B2
(45) Date of Patent: Feb. 24, 2026

(54) COLORIMETRIC APPARATUS AND COLORIMETRIC METHOD

(71) Applicant: SEIKO EPSON CORPORATION, Tokyo (JP)

(72) Inventors: Masahide Moriyama, Matsumoto (JP); Masayoshi Miyakawa, Suwa (JP); Toru Hayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 18/663,881

(22) Filed: May 14, 2024

(65) Prior Publication Data

US 2024/0385039 A1 Nov. 21, 2024

(30) Foreign Application Priority Data

May 15, 2023 (JP) .................................. 2023-079904

(51) Int. Cl.
*G01J 3/10* (2006.01)
*G01J 3/02* (2006.01)
*G01J 3/50* (2006.01)

(52) U.S. Cl.
CPC .............. *G01J 3/10* (2013.01); *G01J 3/0202* (2013.01); *G01J 3/0267* (2013.01); *G01J 3/027* (2013.01); *G01J 3/0289* (2013.01); *G01J 3/50* (2013.01)

(58) Field of Classification Search
CPC ...... G01J 3/0202; G01J 3/0267; G01J 3/0289; G01J 3/027; G01J 3/10; G01J 3/50
See application file for complete search history.

(56) References Cited

U.S. PATENT DOCUMENTS

| | | | |
|---|---|---|---|
| 7,626,724 B2 | 12/2009 | Kalinka | |
| 2008/0174763 A1* | 7/2008 | Ehbets | ...................... G01J 3/02 |
| | | | 356/369 |

FOREIGN PATENT DOCUMENTS

| | | | | |
|---|---|---|---|---|
| WO | WO-2016181721 A1 * | 11/2016 | ................ | G01J 3/50 |
| WO | WO-2018131442 A1 * | 7/2018 | ................ | G01J 3/50 |

* cited by examiner

*Primary Examiner* — Michael A Lyons
*Assistant Examiner* — Christina I Xing
(74) *Attorney, Agent, or Firm* — WORKMAN NYDEGGER

(57) ABSTRACT

A colorimetric apparatus includes a detection unit configured to detect a detection target portion. The detection unit detects the detection target portion based on a change in an output value of a light reception amount at the time when a carriage straddles the detection target portion by moving in a first direction or a third direction in the detection operation. The colorimetric apparatus increases a light projection amount and executes a retry operation when the entire output value of the light reception amount of the detection unit is smaller than a first threshold in the detection operation and reduces the light projection amount and executes the retry operation when the entire output value of the light reception amount of the detection unit is larger than a second threshold in the detection operation.

8 Claims, 16 Drawing Sheets

COLORIMETRIC APPARATUS AND COLORIMETRIC METHOD

The present application is based on, and claims priority from JP Application Serial Number 2023-079904, filed May 15, 2023, the disclosure of which is hereby incorporated by reference herein in its entirety.

BACKGROUND

1. Technical Field

The present disclosure relates to a colorimetric apparatus and a colorimetric method.

2. Related Art

There have been used a variety of colorimetric apparatuses for measuring a color of a colorimetric object. Among the colorimetric apparatuses, there is a colorimetric apparatus including a colorimeter capable of measuring a color of a patch formed at a colorimetric object and a detection unit that detects a detection target portion for position detection formed at the colorimetric object. For example, U.S. Pat. No. 7,626,724 discloses an automatic tracking type spectral colorimetric apparatus in which an optical system for measuring a color matrix is guided using information provided by a prefetch sensor.

However, in a colorimetric apparatus of related art such as the automatic tracking type spectral colorimetric apparatus disclosed in U.S. Pat. No. 7,626,724, it is sometimes difficult to detect a detection target portion with a detection unit depending on a type of a colorimetric object, a use environment of the colorimetric apparatus, and the like. When the detection target portion cannot be detected by the detection unit, the position of the colorimetric object cannot be suitably grasped. It is likely that a defect occurs when a color of a patch is measured. In order to avoid such a defect, it is conceivable to provide a new pattern for setting detection conditions at the time when the detection target portion is detected by the detection unit. However, it is troublesome for a user to prepare a detection condition setting pattern anew and set detection conditions using the detection condition setting pattern.

SUMMARY

According to an aspect of the present disclosure, there is provided a colorimetric apparatus including: a support base configured to support, on a support surface, a colorimetric object on which a patch for color measurement and a detection target portion for detecting a position are formed; a colorimeter configured to measure a color of the patch; a carriage configured to support the colorimeter and movable in a first direction along the support surface and a second direction facing the support surface; a movement mechanism unit configured to move the carriage on the support base in a third direction extending along the support surface and intersecting the first direction; an optical detection unit provided in the carriage and configured to project and receive light to thereby detect the detection target portion; and a control unit, wherein the detection unit detects, in a detection operation for detecting the detection target portion, the detection target portion based on a change in an output value of a light reception amount at a time when the carriage moves in the first direction or the third direction to straddle the detection target portion, and the control unit executes a retry operation for increasing a light projection amount and executing the detection operation again when the entire output value of the light reception amount of the detection unit at the time when the carriage straddles the detection target portion in the detection operation is smaller than a first threshold, reduces the light projection amount and executes the retry operation when the entire output value of the light reception amount of the detection unit at the time when the carriage straddles the detection target portion in the detection operation is larger than a second threshold, and grasps a position of the colorimetric object on the support surface based on a detection result in the retry operation when the retry operation is executed and measures the color of the patch with the colorimeter.

According to another aspect of the present disclosure, there is provided a colorimetric method for a colorimetric apparatus including: a support base configured to support, on a support surface, a colorimetric object on which a patch for color measurement and a detection target portion for detecting a position are formed; a colorimeter configured to measure a color of the patch; a carriage configured to support the colorimeter and movable in a first direction along the support surface and a second direction facing the support surface; a movement mechanism unit configured to move the carriage on the support base in a third direction extending along the support surface and intersecting the first direction; and an optical detection unit provided in the carriage and configured to project and receive light to thereby detect the detection target portion, the detection unit detecting, in a detection operation for detecting the detection target portion, the detection target portion based on a change in an output value of a light reception amount at a time when the carriage moving in the first direction or the third direction to straddle the detection target portion, the colorimetric method including: executing a retry operation for increasing a light projection amount and executing the detection operation again when the entire output value of the light reception amount of the detection unit at the time when the carriage straddles the detection target portion in the detection operation is smaller than a first threshold, reducing the light projection amount and executing the retry operation when the entire output value of the light reception amount of the detection unit at the time when the carriage straddles the detection target portion in the detection operation is larger than a second threshold, and grasping a position of the colorimetric object on the support surface based on a detection result in the retry operation when the retry operation is executed and measuring the color of the patch with the colorimeter.

BRIEF DESCRIPTION OF THE DRAWINGS

FIG. 1 is housed and the carriage is further moved downward from a state illustrated in FIG. 7 and the bottom surface of the carriage comes into contact with the colorimetric object.

DESCRIPTION OF EMBODIMENTS

Figure 1:
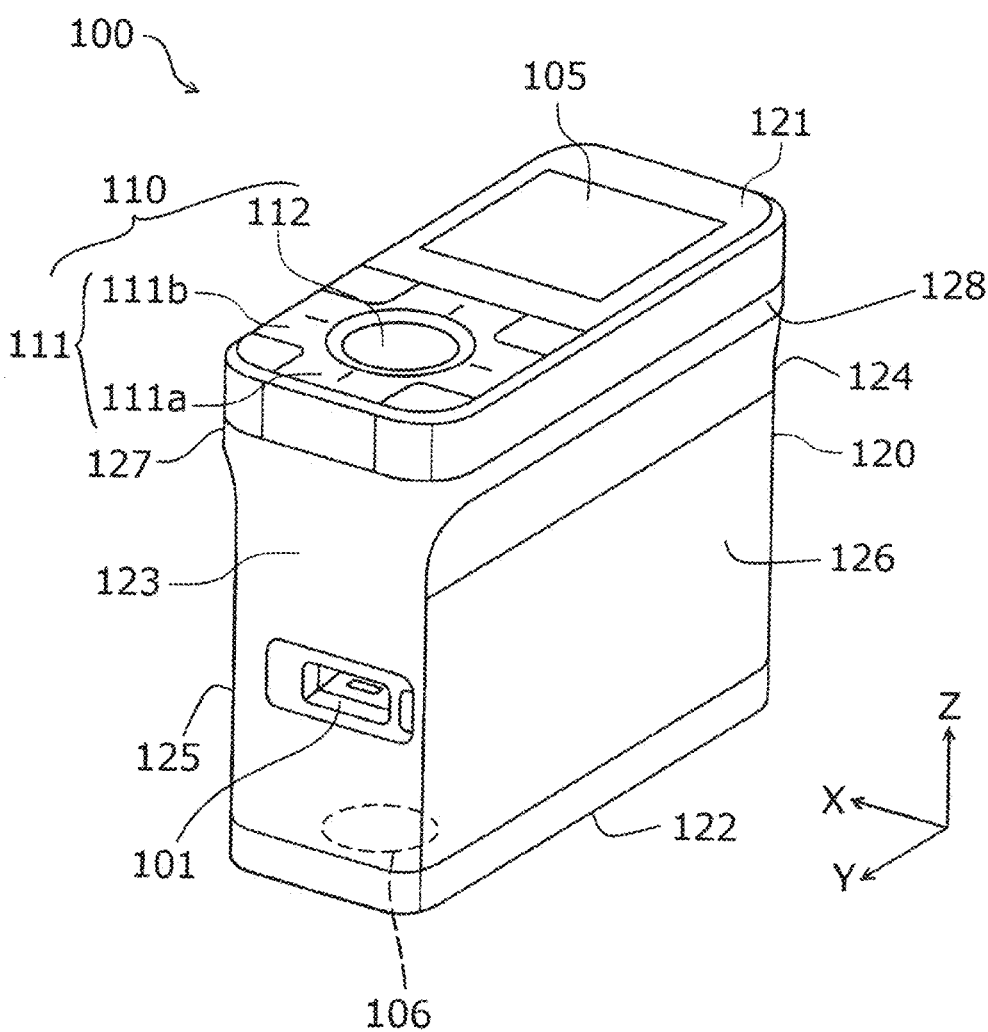
FIG. 1 is a schematic perspective view of a colorimeter that can be used in a colorimetric apparatus according to an example of the present disclosure.

The present disclosure is schematically explained below.

A colorimetric apparatus according to a first aspect includes: a support base configured to support, on a support surface, a colorimetric object on which a patch for color measurement and a detection target portion for detecting a position are formed; a colorimeter configured to measure a color of the patch; a carriage configured to support the colorimeter and movable in a first direction along the support surface and a second direction facing the support surface; a movement mechanism unit configured to move the carriage on the support base in a third direction extending along the support surface and intersecting the first direction; an optical detection unit provided in the carriage and configured to project and receive light to thereby detect the detection target portion; and a control unit. The detection unit detects, in a detection operation for detecting the detection target portion, the detection target portion based on a change in an output value of a light reception amount at a time when the carriage moves in the first direction or the third direction to straddle the detection target portion. The control unit executes a retry operation for increasing a light projection amount and executing the detection operation again when the entire output value of the light reception amount of the detection unit at the time when the carriage straddles the detection target portion in the detection operation is smaller than a first threshold, reduces the light projection amount and executes the retry operation when the entire output value of the light reception amount of the detection unit at the time when the carriage straddles the detection target portion in the detection operation is larger than a second threshold, and grasps a position of the colorimetric object on the support surface based on a detection result in the retry operation when the retry operation is executed and measures the color of the patch with the colorimeter.

According to this aspect, when the entire output value of the light reception amount of the detection unit at the time when the detection unit straddles the detection target portion in the detection operation is smaller than the first threshold, the light projection amount is increased and the retry operation is executed, when the entire output value of the light reception amount of the detection unit at the time when the detection unit straddles the detection target portion in the detection operation is larger than the second threshold, the light projection amount is reduced and the retry operation is executed, and, when the retry operation is executed, the position of the colorimetric object on the support surface is grasped based on the detection result in the retry operation and the color of the patch is measured by the colorimeter. That is, when it is difficult to detect the detection target portion with the detection unit in the detection operation, the detection unit executes the detection operation again under a condition in which the detection target portion is easily detected, and the color measurement operation is executed based on a result of the detection. For this reason, it is possible to suitably detect the detection target portion with the detection unit without preparing a detection condition setting pattern or the like anew. It is possible to suitably grasp the position of the colorimetric object. Therefore, it is possible to prevent a defect from occurring when a color of the patch is measured.

Next, a colorimetric apparatus according to a second aspect is an aspect dependent from the first aspect, wherein, when executing the retry operation, the control unit may execute the detection operation again at the same position as an execution position of the detection operation before the retry operation.

According to this aspect, when the retry operation is executed, the detection operation is executed again at the same position as the execution position of the detection operation before the retry operation. By detecting the detection target portion again at the same position in this way, conditions other than the light projection amount can remain the same. It is highly likely that the detection target portion can be detected.

Next, a colorimetric apparatus according to a third aspect is an aspect dependent from the first or second aspect, wherein, when there are a plurality of the detection target portions in the colorimetric object and the detection operation is executed at a plurality of positions, the control unit may execute the retry operation only on the detection target portion for which the detection operation is executed first.

According to this aspect, when the detection operation is executed at a plurality of positions, it is possible to execute the retry operation only for the detection target portion for which the detection operation is executed first. For example, when it is difficult to detect the detection target portion with the detection unit because of a use environment of the colorimetric apparatus, it is often highly likely that the detection target portion can be detected if the retry operation is performed in one place for one detection unit. For this reason, it is possible to suitably detect the detection target portion with the detection unit while reducing a time required for the retry operation.

Next, a colorimetric apparatus according to a fourth aspect is an aspect dependent from any one of the first to third aspects, wherein the control unit may execute the detection operation at least in two places across a center of the detection target portion in a direction intersecting a moving direction of the carriage in the detection operation.

According to this aspect, the detection operation is executed at least in two places across the center of the detection target portion in the direction intersecting the moving direction of the carriage in the detection operation. By executing the detection operation at a plurality of places across the center of the detection target portion in this way, it is possible to increase detection accuracy of the detection target portion by the detection unit.

Next, a colorimetric apparatus according to a fifth aspect is an aspect dependent from any one of the first to fourth aspects, wherein the carriage may include: a support unit configured to support the colorimeter, the support unit including an opening that exposes a color measurement unit of the colorimeter from the carriage in a state in which the colorimeter is supported by the support unit; and a first detection unit and a second detection unit that are the detection unit and provided across the opening interposed, and the control unit causes each of the first detection unit and the second detection unit to execute the retry operation.

According to this aspect, the first detection unit and the second detection unit are provided across the opening. For this reason, for example, it is possible to narrow a movement range of the carriage by executing the detection of each of the plurality of detection target portions with, of the first detection unit and the second detection unit, the detection unit closer to the detection target object. Consequently, it is possible to prevent the colorimetric apparatus from increasing in size. Further, by causing each of the first detection unit and the second detection unit to execute the retry operation, it is possible to suitably detect, for example, each of the plurality of detection target portions.

Next, a colorimetric apparatus according to a sixth aspect is an aspect dependent from the fifth aspect, wherein, when a plurality of detection target portions are present in the colorimetric object and each of the first detection unit and the second detection unit executes the detection operation at a plurality of positions, the control unit may execute the retry operation only for the detection target portion for which the detection operation is executed first in each of the first detection unit and the second detection unit.

According to this aspect, when the plurality of detection target portions are present in the colorimetric object and each of the first detection unit and the second detection unit executes the detection operation at the plurality of positions, it is possible to execute the retry operation only for the detection target portion for which the detection operation is executed first in each of the first detection unit and the second detection unit. For this reason, it is possible to suitably detect the detection target portion with the first detection unit and the second detection unit while reducing a time required for the retry operation.

A colorimetric apparatus according to a seventh aspect is an aspect dependent from any one of the first to sixth aspects, wherein the control unit may receive information concerning a size of the colorimetric object, set a detection operation execution position of the detection target portion based on the size of the colorimetric object, and execute the detection operation.

According to this aspect, it is possible to receive the information concerning the size of the colorimetric object, set the detection operation execution position of the detection target portion based on the size of the colorimetric object, and execute the detection operation. For this reason, it is possible to efficiently execute the detection operation for colorimetric objects of various sizes.

Next, a colorimetric method according to an eighth aspect is a colorimetric method for a colorimetric apparatus including: a support base configured to support, on a support surface, a colorimetric object on which a patch for color measurement and a detection target portion for detecting a position are formed; a colorimeter configured to measure a color of the patch; a carriage configured to support the colorimeter and movable in a first direction along the support surface and a second direction facing the support surface; a movement mechanism unit configured to move the carriage on the support base in a third direction extending along the support surface and intersecting the first direction; and an optical detection unit provided in the carriage and configured to project and receive light to thereby detect the detection target portion, the detection unit detecting, in a detection operation for detecting the detection target portion, the detection target portion based on a change in an output value of a light reception amount at a time when the carriage moving in the first direction or the third direction to straddle the detection target portion, the colorimetric method including: executing a retry operation for increasing a light projection amount and executing the detection operation again when the entire output value of the light reception amount of the detection unit at the time when the carriage straddles the detection target portion in the detection operation is smaller than a first threshold, reducing the light projection amount and executing the retry operation when the entire output value of the light reception amount of the detection unit at the time when the carriage straddles the detection target portion in the detection operation is larger than a second threshold, and grasping a position of the colorimetric object on the support surface based on a detection result in the retry operation when the retry operation is executed and measuring the color of the patch with the colorimeter.

According to this aspect, when the entire output value of the light reception amount of the detection unit at the time when the detection unit straddles the detection target portion in the detection operation is smaller than the first threshold, the light projection amount is increased and the retry operation is executed, when the entire output value of the light reception amount of the detection unit at the time when the detection unit straddles the detection target portion in the detection operation is larger than the second threshold, the light projection amount is reduced and the retry operation is executed, and, when the retry operation is executed, the position of the colorimetric object on the support surface is grasped based on the detection result in the retry operation and the color of the patch is measured by the colorimeter. That is, when it is difficult to detect the detection target portion with the detection unit in the detection operation, the detection unit executes the detection operation again under a condition in which the detection target portion is easily detected, and the color measurement operation is executed based on a result of the detection. For this reason, it is possible to suitably detect the detection target portion with the detection unit without preparing a detection condition setting pattern or the like anew. It is possible to suitably grasp the position of the colorimetric object. Therefore, it is possible to prevent a defect from occurring when a color of the patch is measured.

The present disclosure is specifically explained below.

Note that an X-Y-Z coordinate system illustrated in the figures is an orthogonal coordinate system. An X-Y plane is a horizontal plane and an X-Z plane and a Y-Z plane are vertical planes. Here, a Z-axis direction is the vertical direction, that is, the height direction, a +Z direction is the vertically upward direction, and a −Z direction is the vertically downward direction. An X-axis direction is the horizontal direction perpendicular to the Z-axis direction, which is the vertical direction. A Y-axis direction is the horizontal direction and is a direction orthogonal to both of the X-axis direction and the Z-axis direction. Note that, in the following explanation, a +Y direction side of a colorimetric apparatus 1 is set as a rear direction side, a −Y direction side of the colorimetric apparatus 1 is set as a front direction side, a +X direction side of the colorimetric apparatus 1 is set as a right direction side, and a −X direction side of the colorimetric apparatus 1 is set as a left direction side.

First, an example of a colorimeter 100 usable in the colorimetric apparatus 1 according to the example of the present disclosure is explained with reference to FIG. 1. The colorimeter 100 according to the present example is an optical device that includes a colorimetric port 106, emits light in the −Z direction from the colorimetric port 106, and receives the light reflected by a color chart 10, which is a colorimetric object, represented by FIG. 2 to perform color measurement. In other words, an optical axis direction is the Z-axis direction and the position of an optical axis corresponds to the position of the colorimetric port 106.

The colorimeter 100 in the present example includes a housing 120 having an upper surface 121, which is a surface on the +Z direction side, a colorimetric surface 122, which is a color measurement unit and is a bottom surface on the −Z direction side and is provided with the colorimetric port 106, a rear surface 123, which is a surface on the +Y direction side, a front surface 124, which is a surface on the −Y direction side, a right side surface 125, which is a surface on the +X direction side, and a left side surface 126, which is a surface on the −X direction side.

On the upper surface 121, an operation unit 110 and a screen unit 105 are disposed in the Y-axis direction. Specifically, the operation unit 110 is provided on the +Y direction side of the upper surface 121 and the screen unit 105 is provided on the −Y direction side of the upper surface 121. The operation unit 110 includes a plus-shaped button 111 formed by a bar shape 111a extended in the Y-axis direction and a bar shape 111b extended in the X-axis direction and a determination button 112 provided in the center of the plus-shaped button 111. For example, for a plurality of menus displayed on the screen unit 105, a user can move, to the front, the rear, the left, and the right, a menu to be active by pressing the plus-shaped button 111 and can determine a desired menu by pressing the determination button 112.

Figure 2:
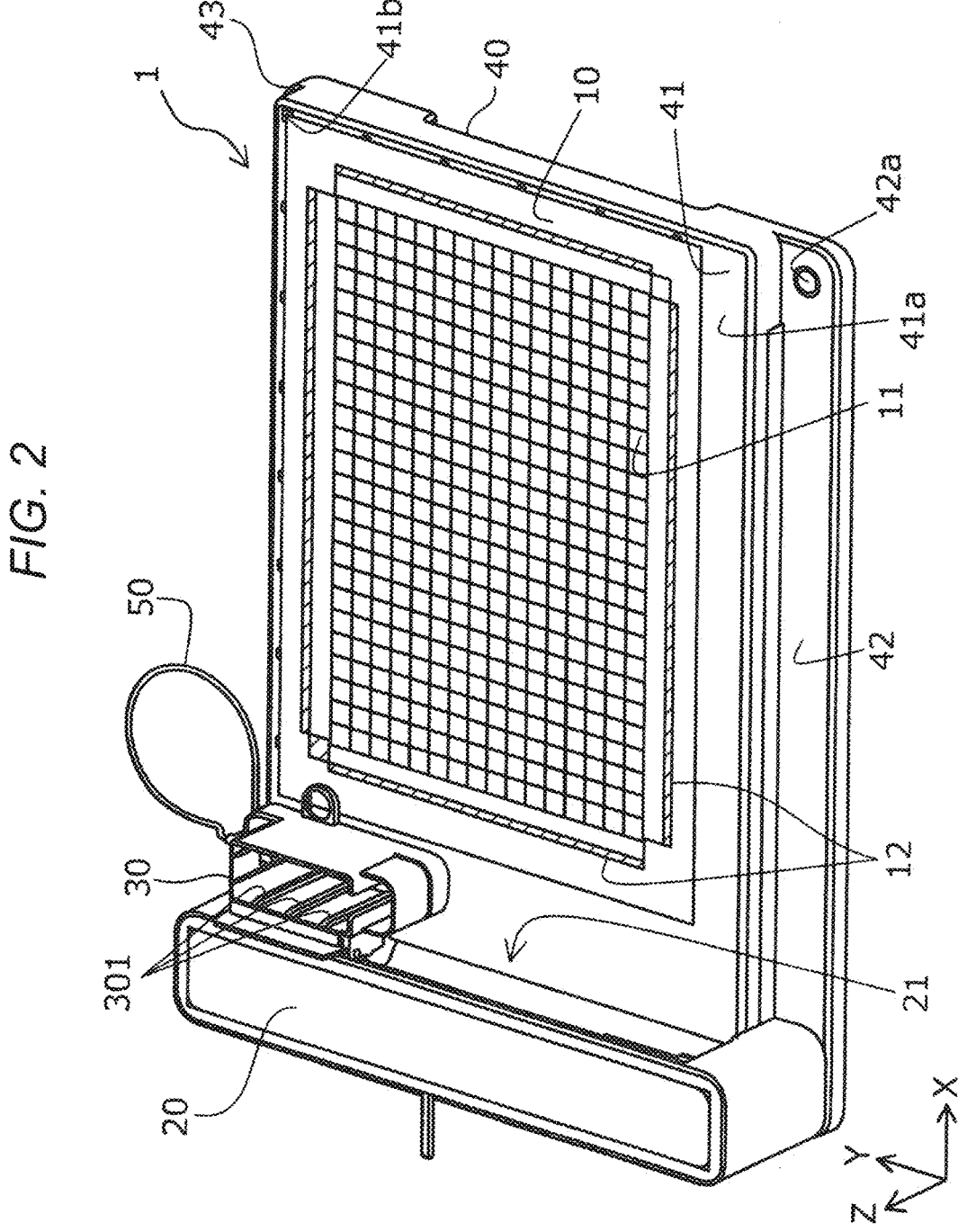
FIG. 2 is a perspective view of the colorimetric apparatus according to the example of the present disclosure.

A terminal 101 to which a USB cable 50 represented by FIG. 2 and the like can be coupled is formed at the rear surface 123. The colorimeter 100 in the present example is provided with a convex portion 127 and a convex portion 128 that are convex toward the outer side when viewed in the Y-axis direction. Specifically, the convex portion 127 is provided in a region further on the +Z direction side than the center in the Z-axis direction on the right side surface 125 and the convex portion 128 is provided in a region further on the +Z direction side than the center in the Z-axis direction on the left side surface 126.

Next, a detailed configuration of the colorimetric apparatus 1 according to the example of the present disclosure is explained with reference to FIGS. 2 to 9. FIG. 2 illustrates a configuration of the colorimetric apparatus 1 according to the present example. The colorimetric apparatus 1 includes a main body unit 40 including a support base 41 extended in the X-axis direction and the Y-axis direction and a gantry 20 extended in the Y-axis direction to cover a part of the support base 41 from the +Z direction side.

A carriage 30 including a support unit 310 capable of housing the colorimeter 100 is attached to the gantry 20. The gantry 20 is movable in the X-axis direction with respect to the support base 41. The carriage 30 is movable in the Y-axis direction with respect to the gantry 20. These movements are also called scanning. Here, the carriage 30 is capable of moving in the Y-axis direction with respect to the gantry 20 and is also capable of moving in the Z-axis direction with respect to the gantry 20. One end of the USB cable 50 is coupled to the gantry 20. The other end of the USB cable 50 is coupled to the colorimeter 100 housed in the carriage 30.

A color chart 10, which is an example of a measurement object, can be placed on the support surface 41a of the support base 41. The color chart 10 is configured by, for example, a plurality of color patches 11 and black frames 12 being on a fabric portion 14. The color chart 10 is fixed to the support base 41 by, for example, pasting an adhesive tape around the color chart 10 and corresponds to, for example, automatic color measurement for up to the A3 size. However, since the gantry 20 is formed in a gate shape when viewed from the X-axis direction and includes a space portion 21 corresponding to the gate shape, long paper exceeding the A3 size in the X-axis direction can also be placed on the support base 41. Details of the color chart 10 are explained below. Note that the support surface 41a is provided with a set position display portion 41b indicating a reference position at the time when the color chart 10 is placed. Although the color chart 10 of a different size can be used in the colorimetric apparatus 1 in the present example, in the color chart 10 of any size, a measured color of the color patches 11 and detection of the black frames 12 can be performed by aligning corners of the color chart 10 with the set position display portion 41*b*.

Note that, on the –Y direction side of the main body unit 40, a front surface 42 is provided in a position further downward to the –Z direction side than the support base 41. On the +Y direction side of the main body unit 40, a rear surface 43 is provided in a position further downward to the –Z direction side than support surface 41*a*. A power button 42*a*, which is an example of an operation unit of the colorimetric apparatus 1, is provided on the front surface 42.

Figure 3:
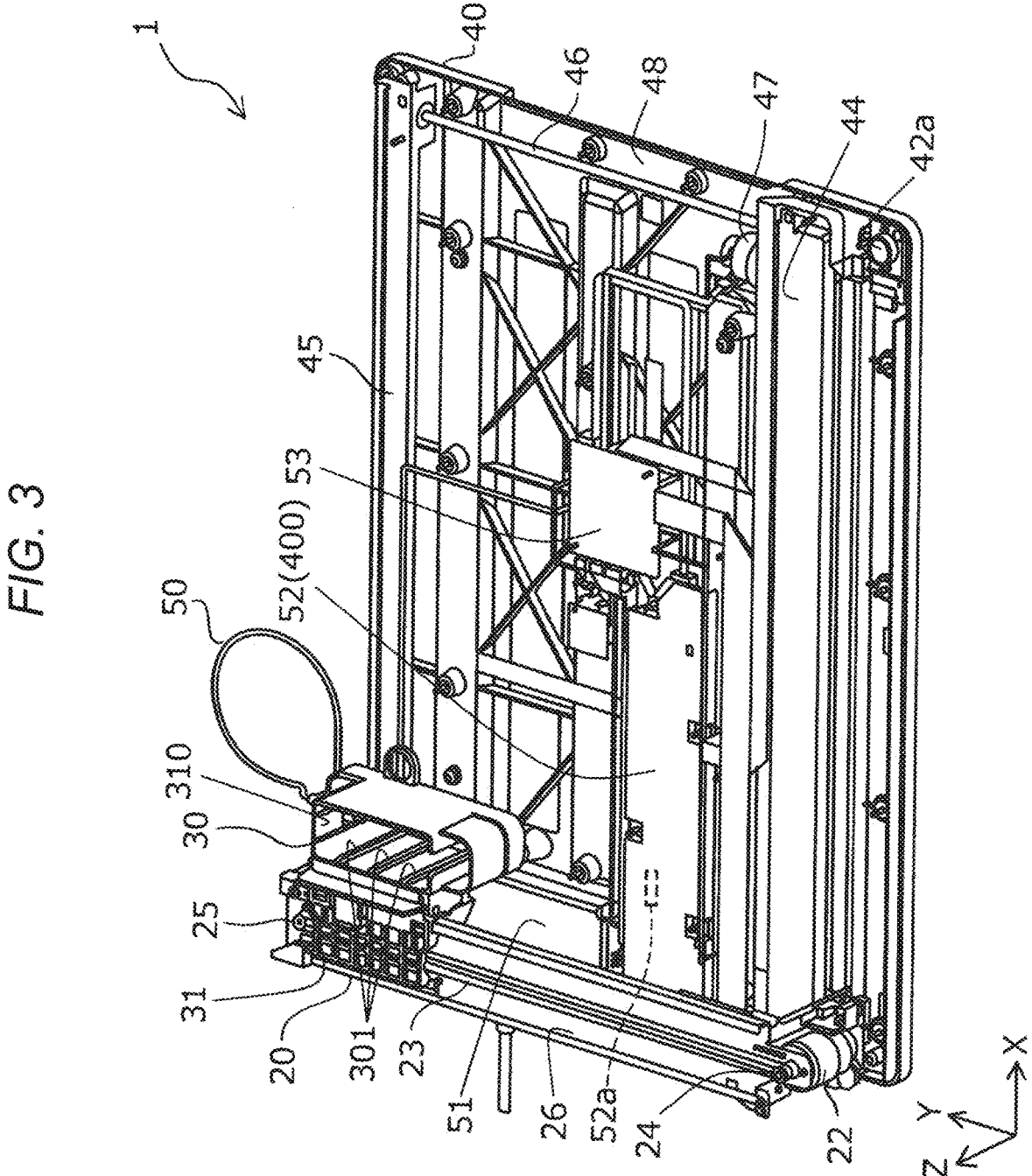
FIG. 3 is a perspective view illustrating an internal configuration of the colorimetric apparatus according to the example of the present disclosure.

FIG. 3 illustrates an internal configuration of the colorimetric apparatus 1 and is a view in which exterior components illustrated in FIG. 2 are removed. A front frame 44 and a rear frame 45 are disposed at an interval on the +Z direction side, which is the upward direction of a case lower 48, to be extended in the X-axis direction. A gantry frame 26 formed in a gate shape configuring a part of the gantry 20 moves in the X-axis direction along the front frame 44 and the rear frame 45.

The front frame 44 and the rear frame 45 are coupled by a coupling shaft 46 in a position on the +X direction side of the main body unit 40. Rotational drive of a gantry motor 47, which is a power source for moving the gantry 20 in the X-axis direction, is transmitted from the gantry motor 47 to the coupling shaft 46 via a not-illustrated gear group. By the rotational drive transmitted to the coupling shaft 46, a not-illustrated endless belt suspended by a not-illustrated pulley provided on the front frame 44 side, which is the –Y direction side of the coupling shaft 46, and a not-illustrated endless belt suspended by a not-illustrated pulley provided on the rear frame 45 side, which is the +Y direction side of the coupling shaft 46, are rotated to move the gantry frame 26 coupled to these endless belts.

A carriage motor 22 is fixed to the front side corresponding to the –Y direction side of the gantry frame 26. An endless carriage belt 23 laid over a front pulley 24 and an inner pulley 25 rotates via the front pulley 24 coupled to the carriage motor 22. A carriage slider 31 configuring a part of the carriage 30 is fixed to the carriage belt 23 and moves in the Y-axis direction according to a rotating motion of the carriage belt 23 involved in a rotating motion of the carriage motor 22. Note that a main board 52 serving as a control unit 400 and a sub-board 53, a power supply box 51, and the like are provided on the inside of the main body unit 40. Note that the main board 52 serving as the control unit 400 is provided with a nonvolatile storage unit 52*a* capable of storing information.

Figure 4:
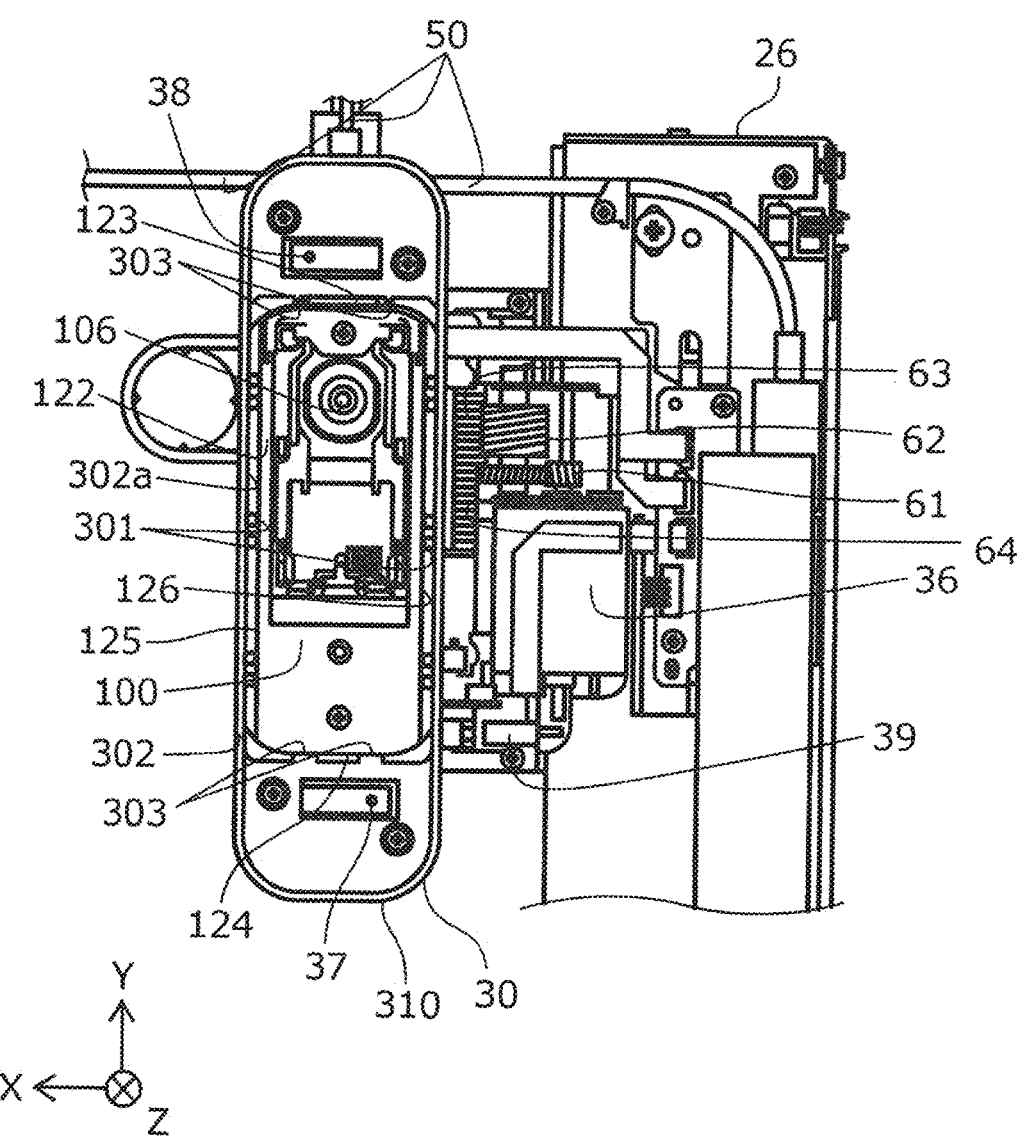
FIG. 4 is a bottom view illustrating the periphery of a carriage of the colorimetric apparatus according to the example of the present disclosure and is a view illustrating a state in which the colorimeter illustrated in FIG. 1 is housed.

FIG. 4 is a bottom view illustrating the periphery of the carriage 30 in a state in which the colorimeter 100 is attached to the carriage 30. In the colorimeter 100, with respect to the carriage 30, the right side surface 125 and the left side surface 126 are supported in the Y-axis direction by ribs 301 provided on the carriage 30 and the rear surface 123 and the front surface 124 are supported in the X-axis direction by ribs 303 provided on the carriage 30. Note that, as represented by FIG. 4, a front side sensor 37 and a rear side sensor 38, which are detection units, capable of detecting the width of the color chart 10 and the positions of the color patches 11 by reading the positions of the black frames 12, which are detection target portions for detecting the position of the color chart 10, are provided on the surface on the –Z direction side of the carriage 30. Details of the rear side sensor 38 serving as a first detection unit and the front side sensor 37 serving as the second detection unit are explained below.

Figure 5:
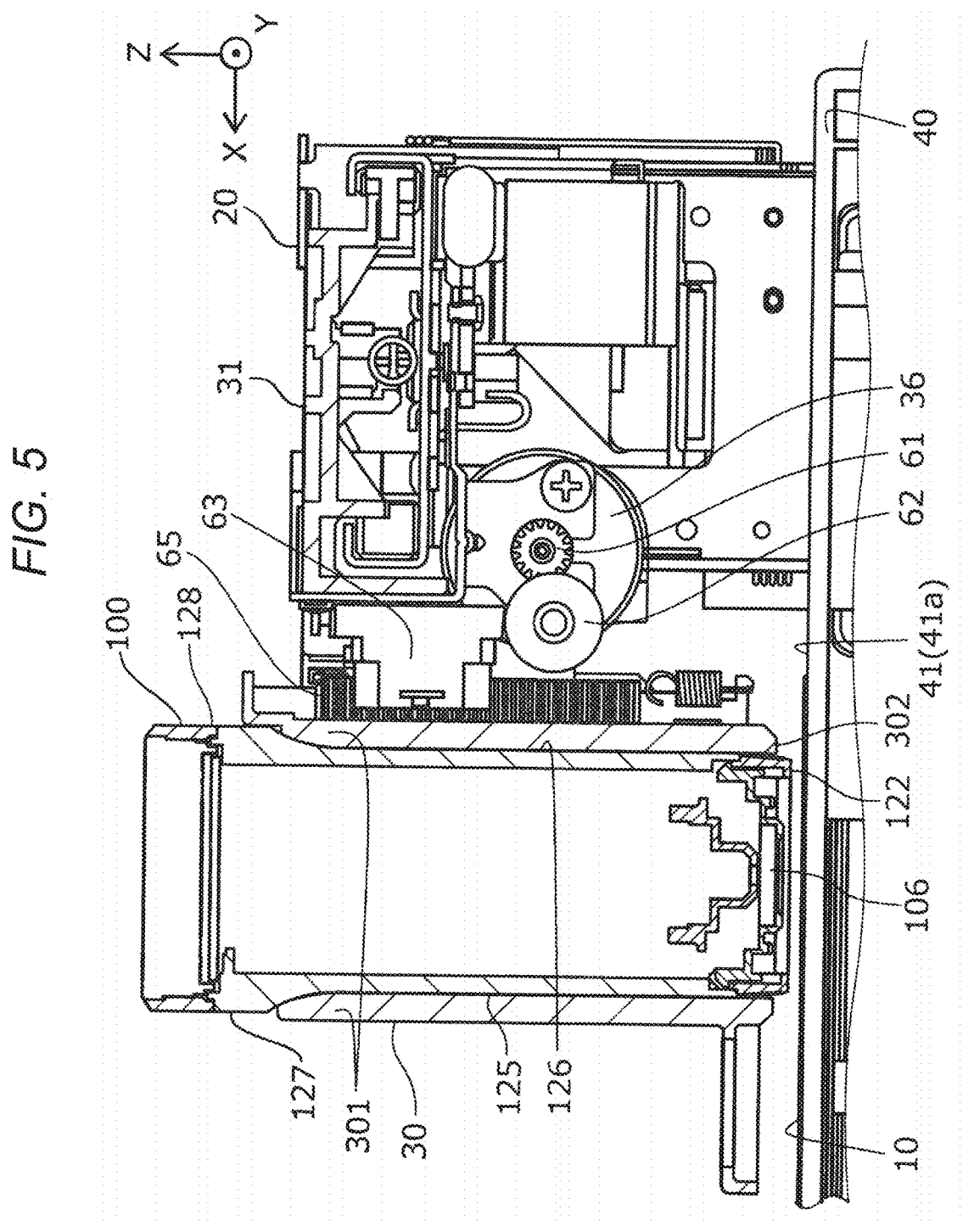
FIG. 5 is a rear view illustrating the periphery of the carriage of the colorimetric apparatus according to the example of the present disclosure and is a view illustrating disposition at the time when the colorimeter illustrated in FIG. 1 is housed and the carriage is scanned.

The carriage 30 slides in the Z-axis direction with respect to the gantry 20 via a rack gear 65 represented by FIG. 5 and the like when the power of a Z-axis moving direction movement motor 36, which is a drive source, is transmitted, in order, to a motor gear 61, a worm gear 62, a first drive gear 63, and a second drive gear 64. As represented by FIG. 4, the carriage 30 is provided with a home position sensor 39 that detects whether the position in the Z-axis direction of the carriage 30 with respect to the gantry 20 is in a home position.

Next, the position in the Z-axis direction of the carriage 30 with respect to the gantry 20, that is, the positions in the Z-axis direction of the carriage 30 and the colorimeter 100 housed in the carriage 30 with respect to the measurement object placed on the support base 41 are explained mainly with reference to FIGS. 5 to 9. FIG. 5 is a diagram illustrating disposition at the time when the carriage 30 is scanned in a state in which the colorimeter 100 is housed in the carriage 30, that is, when the carriage 30 is moved in the Y-axis direction with respect to the gantry 20. At this time, both of the colorimetric surface 122 of the colorimeter 100 and a bottom surface 302 of the carriage 30 are in a state in which there is a gap in the Z-axis direction with respect to the color chart 10, which is the measurement object.

Figure 6:
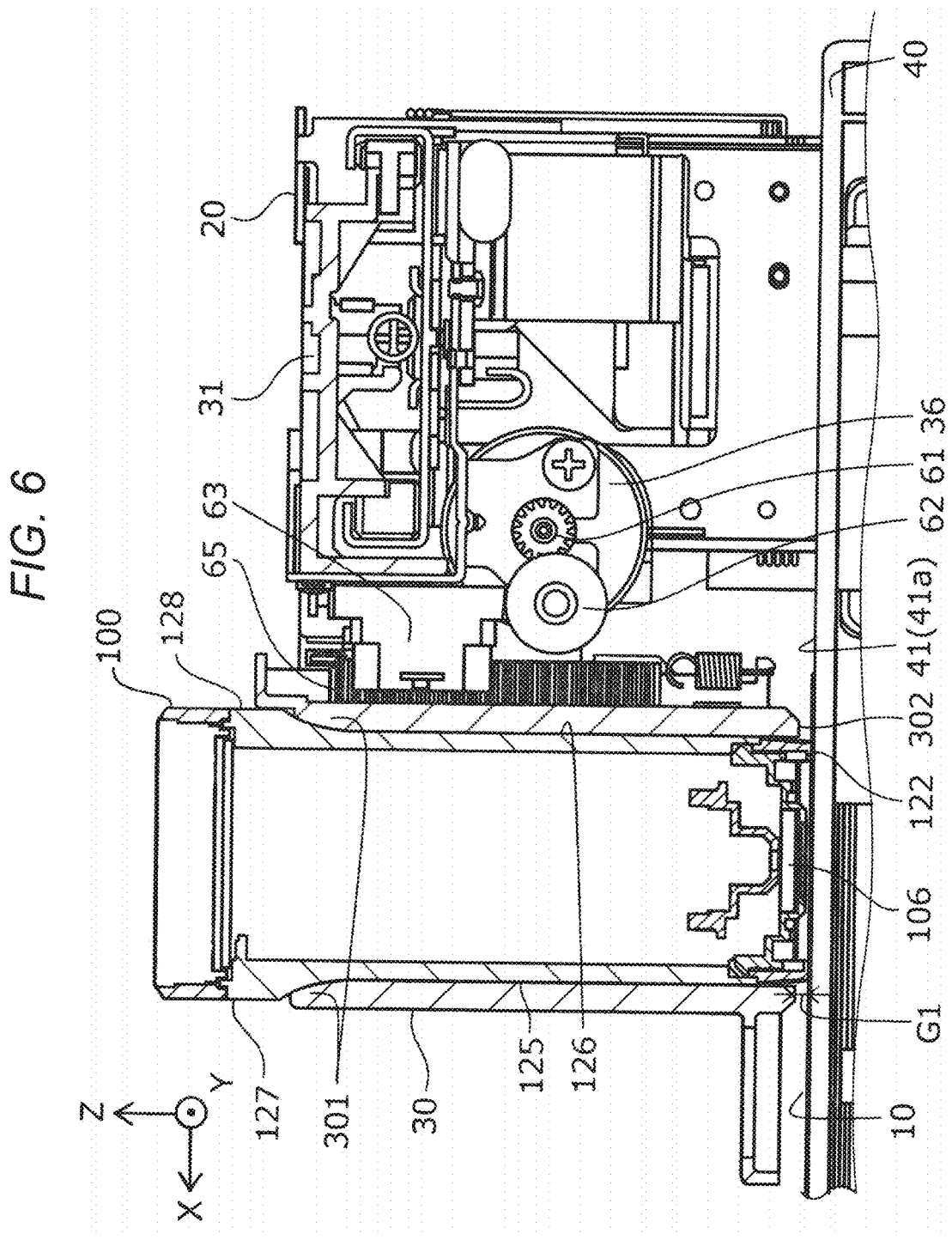
FIG. 6 is a rear view illustrating the periphery of the carriage of the colorimetric apparatus according to the example of the present disclosure and is a view illustrating disposition at the time when the colorimeter illustrated in FIG. 1 is housed and the carriage is moved downward from a state illustrated in FIG. 5 and a color measurement unit comes into contact with a colorimetric object.

FIG. 6 is a diagram illustrating disposition at an instance when the carriage 30 is moved in the –Z direction, which is the downward direction, from the state illustrated in FIG. 5 and the colorimetric surface 122 of the colorimeter 100 comes into contact with the color chart 10. Note that, for example, in the present example, a gap G1 in the Z-axis direction between the bottom surface 302 of the carriage 30 and the color chart 10 at this time is 2 mm. Here, in the present example, the colorimeter 100 is housed in the carriage 30 in a state in which the convex portion 127 and the convex portion 128 are caught by and placed on the ribs 301 provided in the carriage 30 with own weight of the colorimeter 100, and the colorimetric surface 122 of the colorimeter 100 projects in the –Z direction from an opening 302*a* provided on the bottom surface 302 of the carriage 30 represented by FIG. 4.

Figure 7:
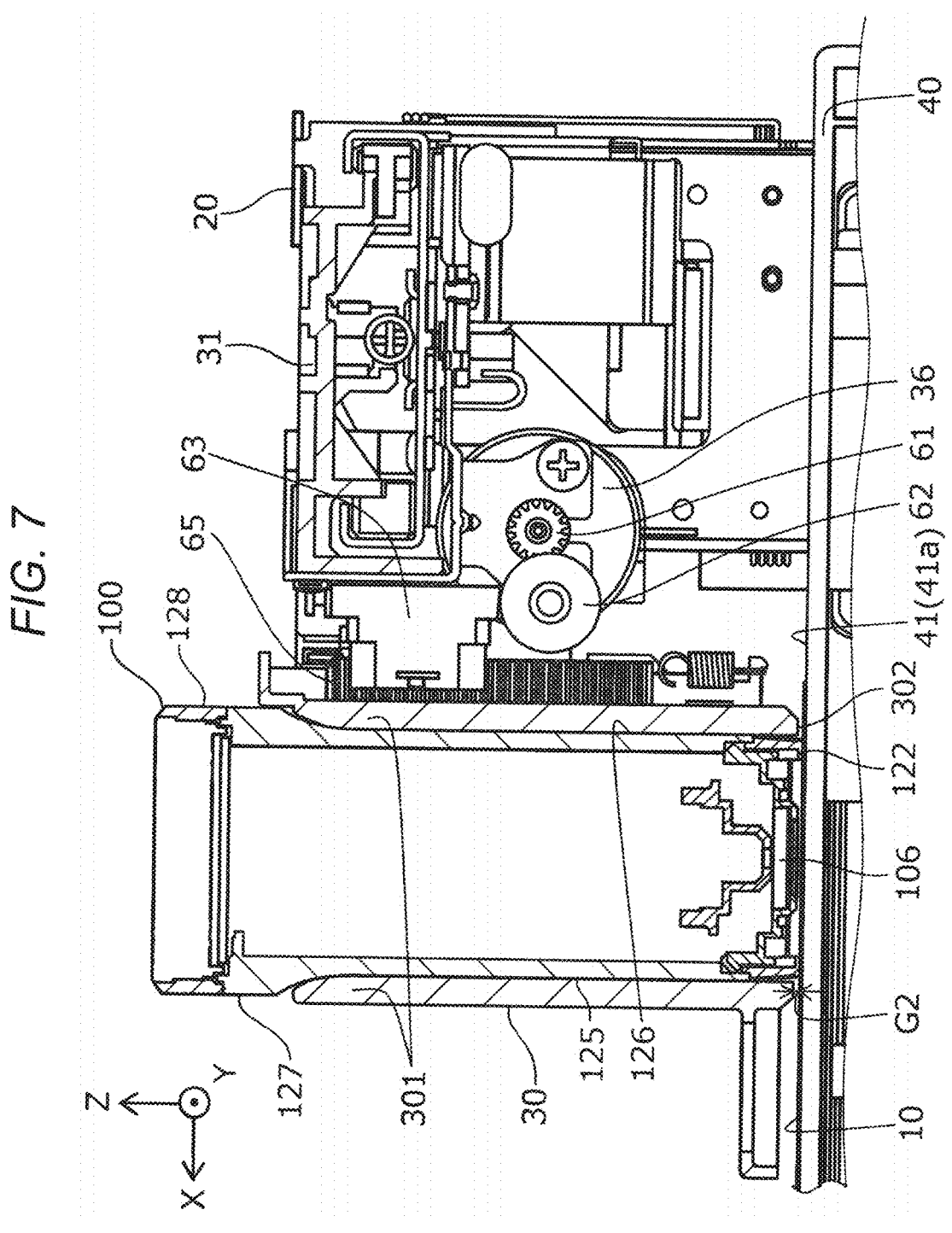
FIG. 7 is a rear view illustrating the periphery of the carriage of the colorimetric apparatus according to the example t disclosure and is a view illustrating disposition at the time when the colorimeter illustrated in FIG. 1 is housed and the carriage is further moved downward from a state illustrated in FIG. 6 to measure a color of the colorimetric object.

For this reason, as represented by FIG. 7, when the carriage 30 is further moved in the –Z direction from the state illustrated FIG. 6, the own weight of the colorimeter 100 is applied to the colorimetric surface 122. Note that FIG. 7 illustrates disposition of the colorimetric object at the time of color measurement, that is, disposition of the color patches 11, the black frames 12, and the like of the color chart 10 at the time when color measurement is performed. Note that, for example, in the present example, a gap G2 in the Z-axis direction between the bottom surface 302 of the carriage 30 and the color chart 10 is 1 mm. In other words, the colorimetric apparatus 1 in the present example is in a state in which, at the time of color measurement of the colorimetric object, the colorimetric surface 122 comes into contact with the colorimetric object but a gap is provided on the bottom surface 302 of the carriage 30.

In the colorimetric apparatus 1 in the present example, the color measurement is performed in a state in which the entire circumference of the colorimetric surface 122 of the colorimeter 100 viewed from the Z-axis direction comes into contact with the color chart 10 on the support base 41 and conforms to the surface of the color chart 10. With such a configuration, since the color measurement can be performed in a state in which the colorimetric port 106, which is an optical axis opening, of the colorimeter 100 is covered with the colorimetric surface 122, the color measurement is less easily affected by external light and color measurement accuracy is improved. Note that it is possible to perform the color measurement in a state in which the color measurement is less easily affected by external light even in the state illustrated in FIG. 6. However, deviation sometimes occurs in a holding position of the colorimeter 100 by the carriage 30 or the distance from the colorimetric surface 122 to the support surface 41*a* because tolerance involved in, for example, manufacturing variations of components occurs in the carriage 30, the colorimeter 100, and the support base 41. However, by further lowering the carriage 30 from the state illustrated in FIG. 6, the color measurement can be performed without being affected by such a tolerance.

In the state illustrated in FIG. 7, the gap G2 is formed between the bottom surface 302 of the carriage 30 and the color chart 10 and the bottom surface 302 of the carriage 30 and the color chart 10 are separated. For this reason, the weight of the carriage 30 is not transmitted to the color chart 10, and only the weight of the colorimeter 100 is applied to the color chart 10. Therefore, since the colorimeter 100 comes into contact with the color chart 10 in a state in which an appropriate load is applied to the colorimeter 100, the color chart 10 is less easily damaged.

Figure 8:
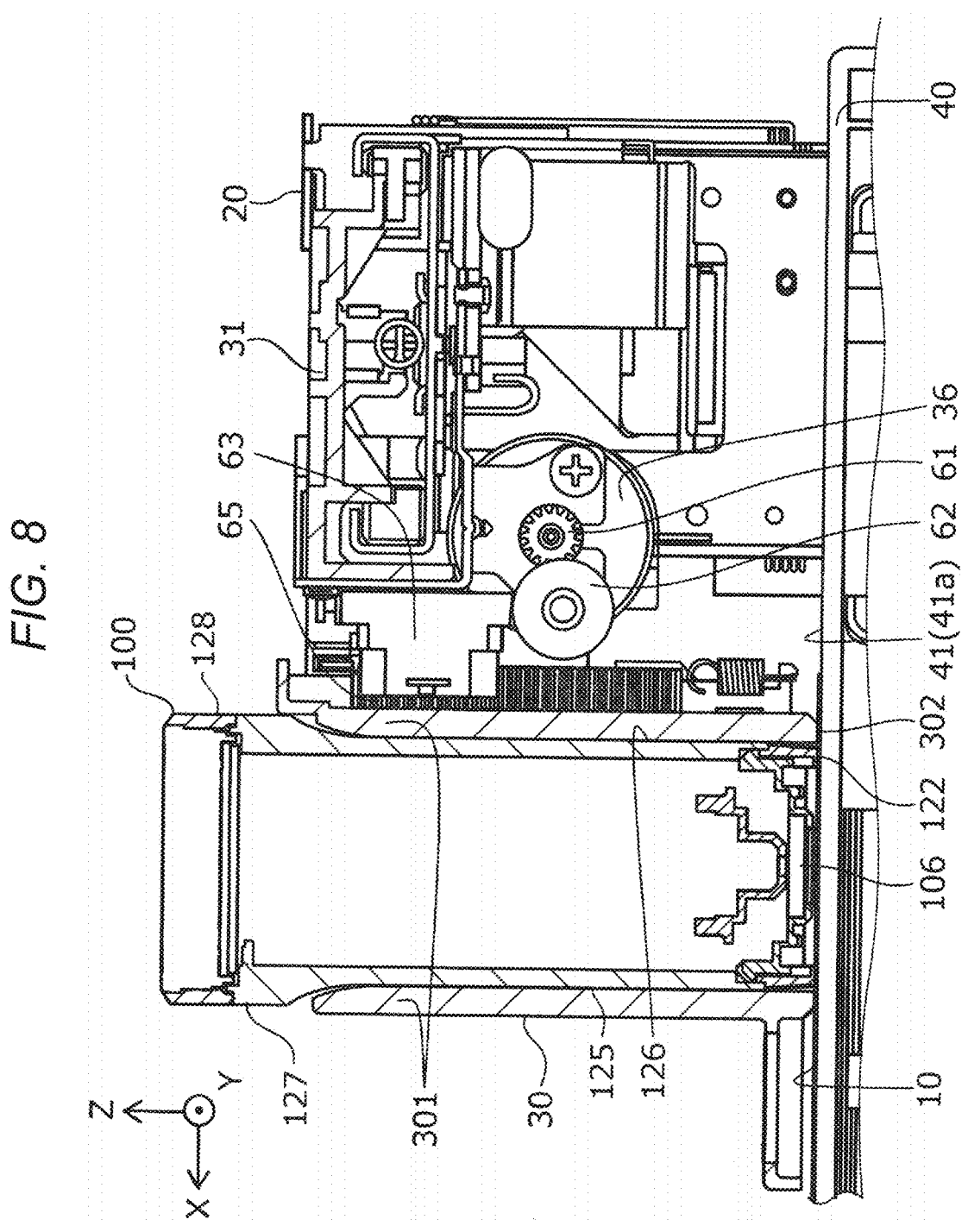
FIG. 8 is a rear view illustrating the periphery of the carriage of the colorimetric apparatus according to the example of the present disclosure and is a view illustrating disposition in which the colorimeter illustrated

Note that the colorimetric apparatus 1 in the present example can measure colors of various colorimetric objects. As the colorimetric object for which the colorimetric apparatus 1 in the present example is capable of performing color measurement, there are colorimetric objects having various thicknesses. For this reason, the colorimetric apparatus 1 in the present example can bring the carriage 30 into contact with the colorimetric object by moving the carriage 30 in the Z-axis direction with respect to the colorimetric object in use and measure contact height, which is the height of the carriage 30, at the time of the contact. From another viewpoint, the contact height of the carriage 30 is the height of the carriage 30 at the time when the carriage 30 comes into contact with the colorimetric object. Specifically, the colorimetric apparatus 1 in the present example can learn the contact height of the carriage 30 by, in order to learn the contact height of the carriage 30, driving the Z-axis moving direction movement motor 36 to continue to reduce the height of the carriage 30 until the bottom surface 302 of the carriage 30 hits the colorimetric object and the load of the Z-axis moving direction movement motor 36 exceeds a certain threshold and detecting the height at which the load exceeds the threshold. In order to learn the contact height of the carriage 30, FIG. 8 illustrates a state at the time when the bottom surface 302 of the carriage 30 hits the color chart 10, which is the colorimetric object, and the load of the Z-axis moving direction movement motor 36 exceeds the certain threshold.

Figure 9:
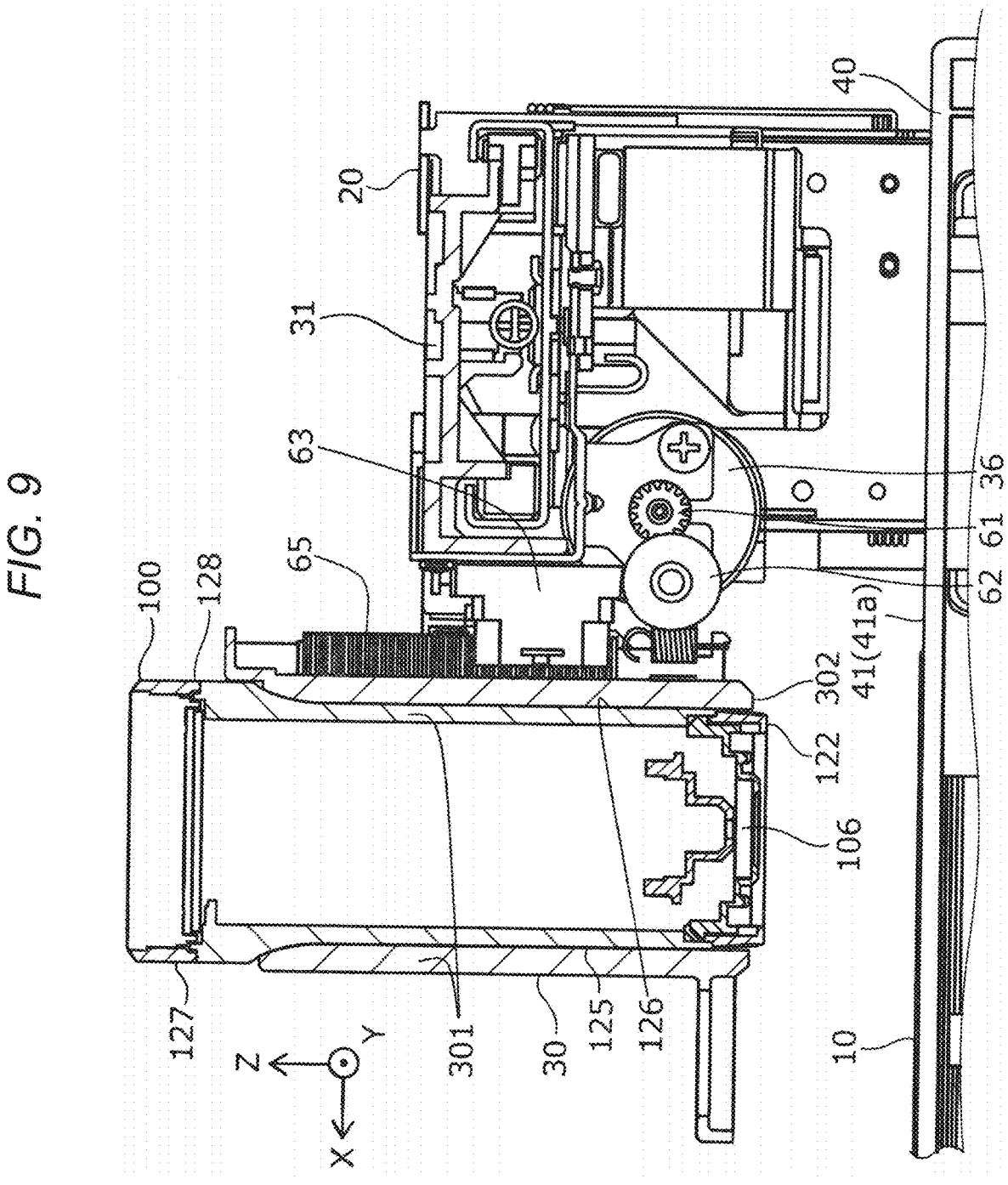
FIG. 9 is a rear view illustrating the periphery of the carriage of the colorimetric apparatus according to the example of the present disclosure and is a view illustrating disposition in a state in which the colorimeter illustrated in FIG. 1 is housed and the carriage is moved to a home position.

As explained above, the colorimetric apparatus 1 in the present example is provided with the home position sensor 39 that detects whether the position in the Z-axis direction of the carriage 30 with respect to the gantry 20 is in the home position. FIG. 9 illustrates a state in which the carriage 30 is in the home position in the Z-axis direction.

As explained above, the colorimetric apparatus 1 in the present example includes the support base 41 that supports the color chart 10, which is the colorimetric object, on the support surface 41*a*. Here, the color chart 10 includes the color patches 11, which are patches for color measurement, and the black frames 12, which are a detection target portion for detecting a position. The colorimetric apparatus 1 in the present example is provided with the colorimeter 100 that measures colors of the color patches 11. The colorimetric apparatus 1 in the present example includes the carriage 30 that supports the colorimeter 100 and is movable in the Y-axis direction, which is the first direction along the support surface 41*a*, and the Z-axis direction, which is the second direction facing the support surface 41*a*. The colorimetric apparatus 1 in the present example includes a gantry 20 serving as a movement mechanism unit capable of moving the carriage 30 on the support base 41 in the X-axis direction, which is a third direction extending along the support surface 41*a* and intersecting the Y-axis direction.

Further, the colorimetric apparatus 1 in the present example includes a front side sensor 37 and a rear side sensor 38 serving as the detection units. Both of the front side sensor 37 and the rear side sensor 38 are optical detection units that are provided on the carriage 30 and detect the black frames 12 by projecting and receiving light. Here, both of the front side sensor 37 and the rear side sensor 38 are configured to be capable of detecting the black frames 12 based on a change in an output value of the light reception amount at the time when the carriage 30 moves in the Y-axis direction or the X-axis direction to straddle the black frames 12 in the detection operation for detecting the black frames 12.

Figure 10:
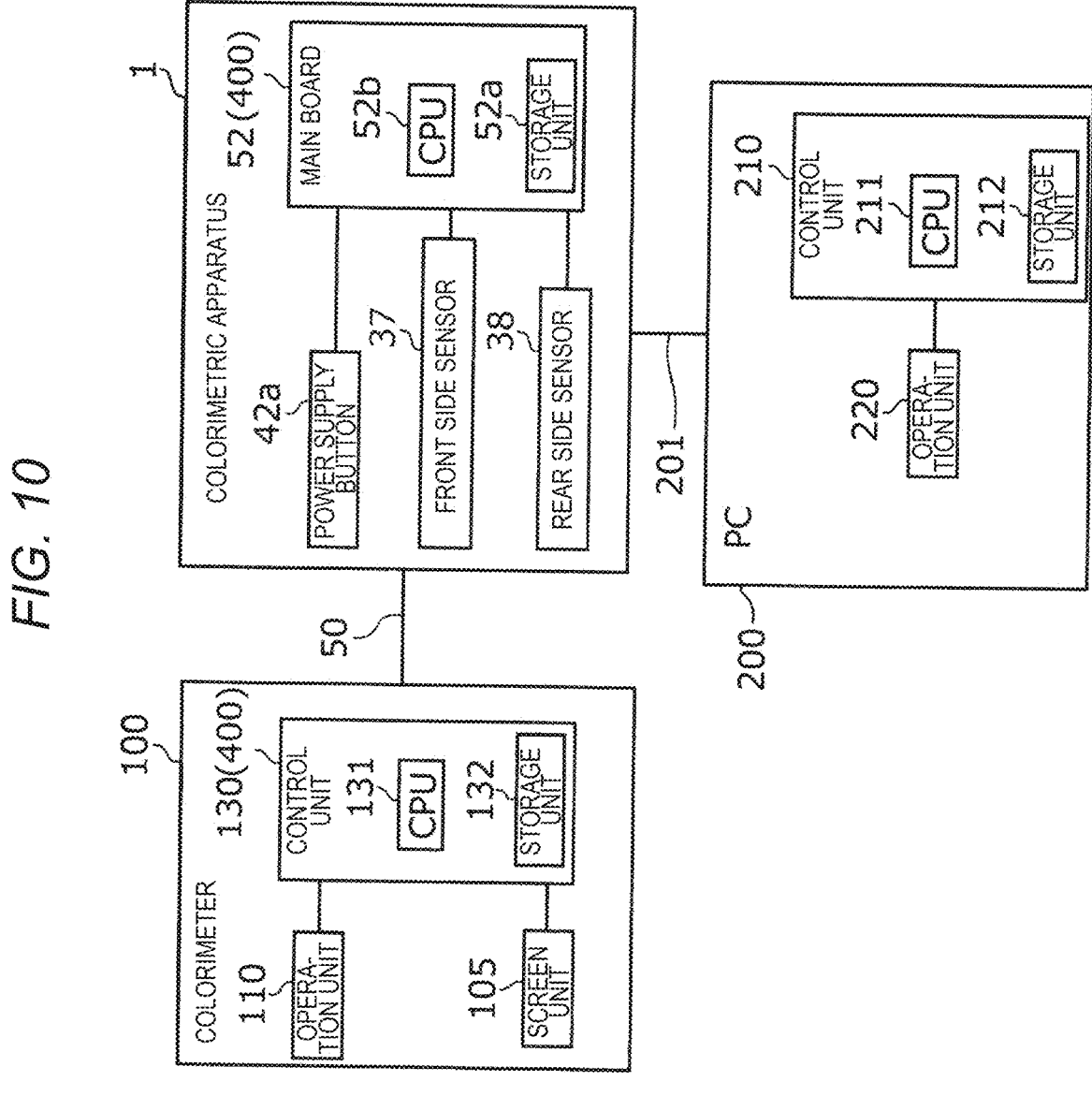
FIG. 10 is a block diagram illustrating an electric configuration of the colorimetric apparatus according to the example of the present disclosure.

Next, an electric configuration of the colorimetric apparatus 1 in the present example is explained with reference to FIG. 10. As represented by FIG. 10, the colorimetric apparatus 1 in the present example includes the main board 52 serving as the control unit 400. As explained above, the colorimetric apparatus 1 in the present example includes a plurality of boards such as the sub-board 53 in addition to the main board 52. However, in FIG. 10, the boards other than the main board 52 are omitted. The main board 52 includes a CPU (Central Processing Unit) 52*b* in addition to the nonvolatile storage unit 52*a*. The power button 42*a* serving as an operation unit is electrically coupled to the main board 52. The colorimetric apparatus 1 in the present example includes the rear side sensor 38 serving as the first detection unit and the front side sensor 37 serving as the second detection unit.

A colorimeter 100 is coupled to the colorimetric apparatus 1 via a USB cable 50. Note that, in the present example, the colorimetric apparatus 1 and the colorimeter 100 are electrically connected via the USB cable 50. However, the present disclosure is not limited to such a configuration. The colorimetric apparatus 1 and the colorimeter 100 may be electrically connected by a wire other than the USB cable or may be wirelessly electrically connected by wireless communication. The colorimeter 100 includes a control unit 130 serving as the control unit 400 of the colorimetric apparatus 1 in the present example. The control unit 130 is provided with a CPU 131, a storage unit 132, and the like. The operation unit 110 and the screen unit 105 are electrically coupled to the control unit 130. Note that, as explained above, in the colorimetric apparatus 1 in the present example, the control unit 400 includes the main board 52 and the control unit 130 provided in the colorimeter 100. However, the present disclosure is not limited to the configuration including the plurality of control units 400 as in the colorimetric apparatus 1 in the present example, for example, only one control unit 400 may be provided.

Further, a personal computer (PC) 200 is coupled to the colorimetric apparatus 1 via a USB cable 201. Note that, in the present example, the colorimetric apparatus 1 and the colorimeter 100 are electrically connected via the USB cable 201. However, the present disclosure is not limited to such a configuration, and the colorimetric apparatus 1 and the PC 200 may be electrically connected by a wire other than a USB cable or may be electrically connected by wireless communication. The PC 200 includes a control unit 210 and an operation unit 220 such as a keyboard and a mouse electrically coupled to the control unit 210. Here, the control unit 210 is provided with a CPU 211, a storage unit 212, and the like. The storage unit 212 stores a plurality of applications in addition to various data and the like. The user can input various instructions via the operation unit 220 using the applications.

Figure 11:
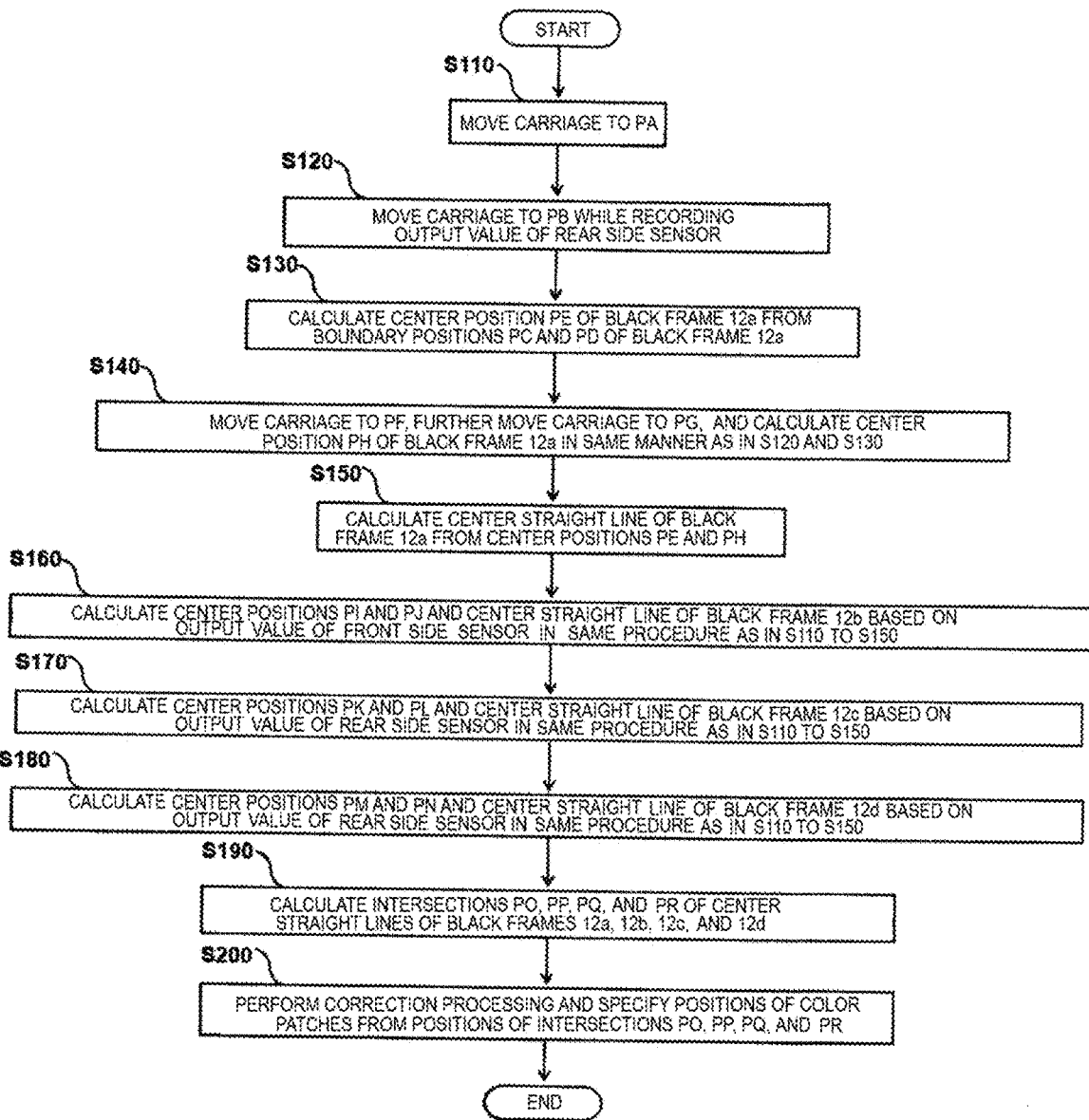
FIG. 11 is an example of a flow of a detection operation for a detection target portion in a colorimetric method performed using the colorimetric apparatus according to the example of the present disclosure and is a flowchart illustrating a flow for specifying the position of the colorimetric object according to a detection result of the detection target portion by a first detection unit and a second detection unit.
Figure 12:
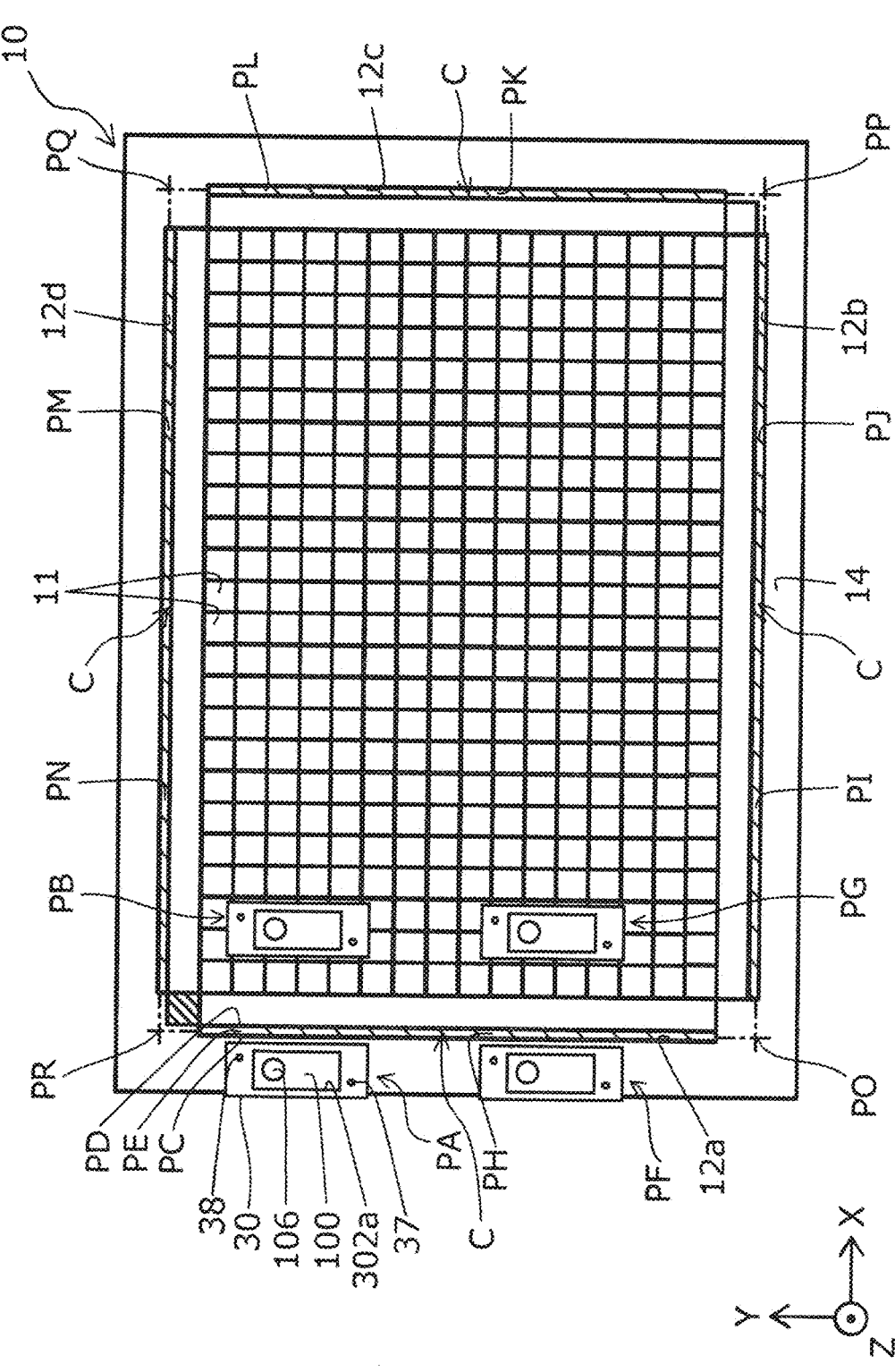
FIG. 12 is a plan view of the colorimetric object and is a diagram illustrating positions of the first detection unit and the second detection unit at the time of the detection of the detection target portion by the first detection unit and the second detection unit.
Figure 13:
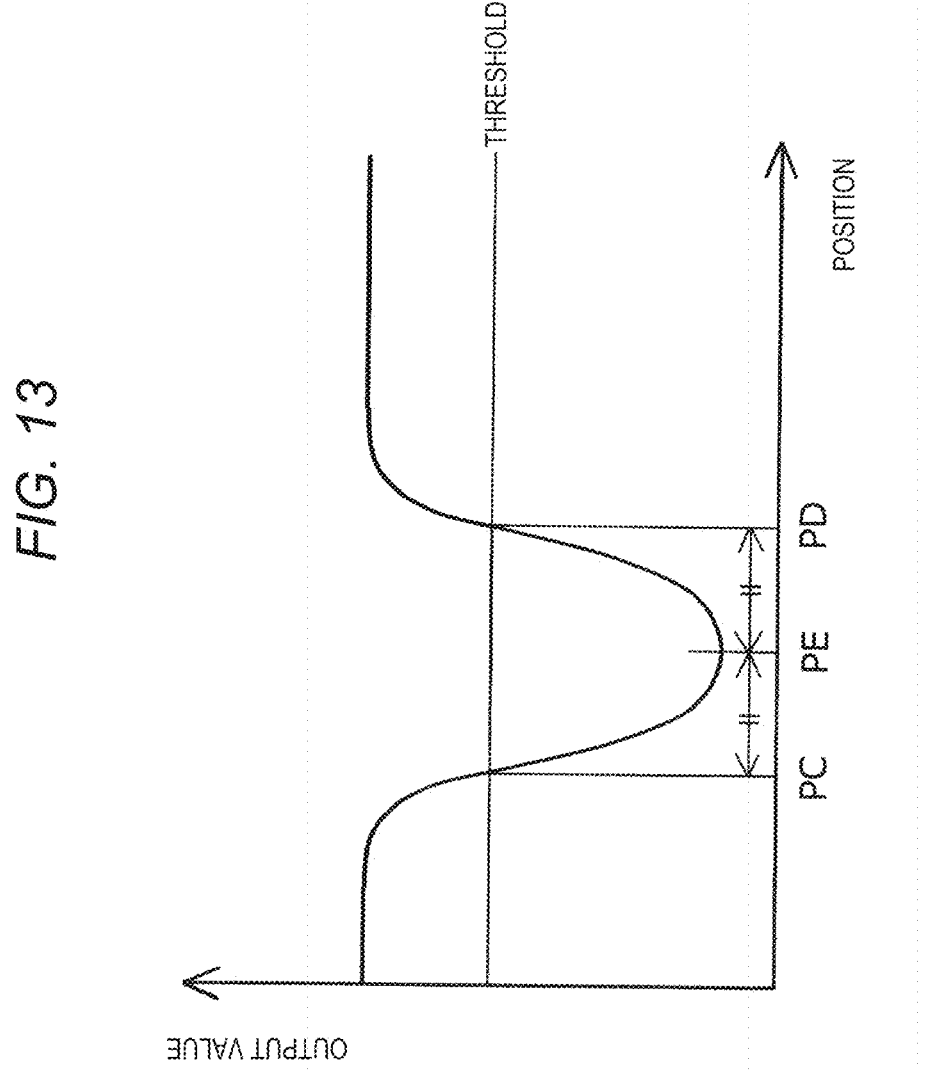
FIG. 13 is a graph illustrating a relation between the position of the first detection unit and the output value at the time of the detection of the detection target portion by the first detection unit and is a graph in the case in which an output value of a light reception amount of the first detection unit is proper.

A colorimetric method using the colorimetric apparatus 1 in the present example is explained below. Here, FIG. 11 is an example of a flow of a detection operation for a detection target portion and is a flow of detecting the black frames 12 serving as detection target portions with the rear side sensor 38 serving as the first detection unit and the front side sensor 37 serving as the second detection unit and specifying the positions of the color charts 10 and the positions of the color patches 11 according to a result of the detection. FIG. 12 is a plan view of the color chart 10 and is a view illustrating the positions of the front side sensor 37 and the rear side sensor 38 at the time of detection of the black frames 12 by the front side sensor 37 and the rear side sensor 38. Note that FIG. 12 is a transparent view of the carriage 30 to clearly illustrate the positions of the constituent members. FIG. 13 is a graph illustrating a relation between the position of the rear side sensor 38 and an output value at the time of detection of a black frame 12a by the rear side sensor 38. Note that the same graph is obtained when the black frames 12 other than the black frame 12a are detected by the rear side sensor 38 or when the black frames 12 are detected by the front side sensor 37. Here, as represented by FIG. 4 and the like, the carriage 30 includes the support unit 310 that supports the colorimeter 100. The support unit 310 has a hole 302a, which is an opening for exposing the colorimetric surface 122 of the colorimeter 100 from the carriage 30 in a state in which the colorimeter 100 is supported. The front side sensor 37 and the rear side sensor 38 that detect the black frames 12 serving as the detection target portions are provided in the carriage 30 across the hole 302a.

Note that, in the flowchart of FIG. 11, all of steps are executed by the control of the main board 52 serving as the control unit 400. In the flowchart of FIG. 11, the inclination of the color chart 10 represented by FIG. 12 with respect to the support base 41 viewed from the Z-axis direction is specified and the positions of the color patches 11 are specified based on a result of specifying the inclination. The color chart 10 represented by FIG. 12 is square and the black frames 12 serving as the detection target portions are formed along four sides of the color chart 10 around a region where the color patches 11 are formed. Specifically, the color chart 10 represented by FIG. 12 includes, as the black frames 12, a black frame 12a formed in the vicinity of a side on the –X direction side of the color chart 10, a black frame 12b formed in the vicinity of a side on the –Y direction side of the color chart 10, a black frame 12c formed in the vicinity of a side on the +X direction side of the color chart 10, and a black frame 12d formed in the vicinity of a side on the +Y direction side of the color chart 10. The storage unit 52a of the colorimetric c apparatus 1 stores information concerning a positional relationship of the color patches 11 with respect to the black frame 12a, the black frame 12b, the black frame 12c, and the black frame 12d. That is, the positions of the color patches 11 can be grasped from the positions of the respective black frames 12. Note that, although the black frames 12 in the present example are formed continuously along the sides of the color chart 10, the black frames 12 may be discontinuously formed like, for example, dotted lines or may be provided only at specific positions along the sides.

When the flowchart of FIG. 11 is started, first, in step S110, the main board 52 drives the carriage motor 22 and the like to move the carriage 30 to a position PA represented by FIG. 12. Subsequently, in step S120, the main board 52 drives the gantry motor 47 and the like to move the carriage 30 to a position PB represented by FIG. 12. Here, when moving the carriage 30 from the position PA to the position PB, the main board 52 turns on the rear side sensor 38 serving as the first detection unit and records an output value the rear side sensor 38. A graph of FIG. 13 illustrates the output value of the rear side sensor 38 at the time when the carriage 30 is moved from the position PA to the position PB.

Subsequently, in step S130, the main board 52 calculates boundary positions PC and PD of the black frame 12a with respect to the fabric portion 14 from the output value acquired in step S120. Specifically, the main board 52 sets a point in time when the output value falls below a predetermined threshold as the boundary position PC and sets a point in time when the output value exceeds the threshold again as the boundary position PD. The main board 52 calculates an intermediate point between the boundary positions PC and PD as a center position PE of the black frame 12a.

Subsequently, in step S140, the main board 52 drives the carriage motor 22, the gantry motor 47, and the like to move the carriage 30 to a position PF represented by FIG. 12. Further, the main board 52 drives the gantry motor 47 and the like to move the carriage 30 to a position PG represented by FIG. 12. Note that, at this time as well, the main board 52 turns on the rear side sensor 38 and records an output value of the rear side sensor 38. Then, the main board 52 calculates a center position PH of the black frame 12a from the output value. Here, the center position PH deviates in the Y-axis direction with respect to the center position PE. A straight line connecting the center position PH and the center position PE is a center straight line of the black frame 12a. In step S150, the main board 52 calculates the center straight line of the black frame 12a.

Subsequently, in step S160, the main board 52 calculates center positions PI and PJ of the black frame 12b and a center straight line of the black frame 12b in the same procedure as step S110 to step S150. However, a moving direction of the carriage 30 at the time when the black frame 12b is detected is a direction in the Y-axis direction. At this time, the front side sensor 37 serving as the second detection unit is used rather than the rear side sensor 38 serving as the first detection unit. As represented by FIG. 12, the front side sensor 37 is provided further on the –X direction side than the rear side sensor 38 and the front side sensor 37 is provided further on the –Y direction side than the rear side sensor 38. For this reason, by detecting the black frame 12b on the –Y direction side with the front side sensor 37, it is possible to narrow a scanning range of the carriage 30 in the Y-axis direction and it is possible to reduce the length of the support base 41 in the Y-axis direction.

Subsequently, in step S170, the main board 52 calculates center positions PK and PL of the black frame 12c and a center straight line of the black frame 12c in the same procedure as step S110 to step S150. A moving direction of the carriage 30 at the time when the black frame 12c is detected is a direction in the X-axis direction. At this time, the rear side sensor 38 is used. Subsequently, in step S180, the main board 52 calculates center positions PM and PN of the black frame 12d and a center straight line of the black frame 12d in the same procedure as step S110 to step S150. A moving direction of the carriage 30 at the time when the black frame 12*d* is detected is the direction in the Y-axis direction. At this time, the rear side sensor 38 is used.

Subsequently, in step S190, the main board 52 calculates, from, the center straight line of the black frame 12*a*, the center straight line of the black frame 12*b*, the center straight line of the black frame 12*c*, and the center straight line of the black frame 12*d*, intersections PO, PP, PQ, and PR of the center straight lines. Here, the main board 52 is capable of recognizing, from the positions of the intersections PO, PP, PQ, and PR, for example, whether the color chart 10 originally having a rectangular shape is deformed into a trapezoidal shape. Therefore, in step S200, the main board 52 performs correction processing such as trapezoidal correction from the positions of the intersections PO, PP, PQ, and PR, specifies the positions of the color patches 11, and ends this flowchart. When this flowchart is ended, a color measurement operation for the color patches 11, the positions of which have been identified by the present flowchart, can be started.

Figure 15:
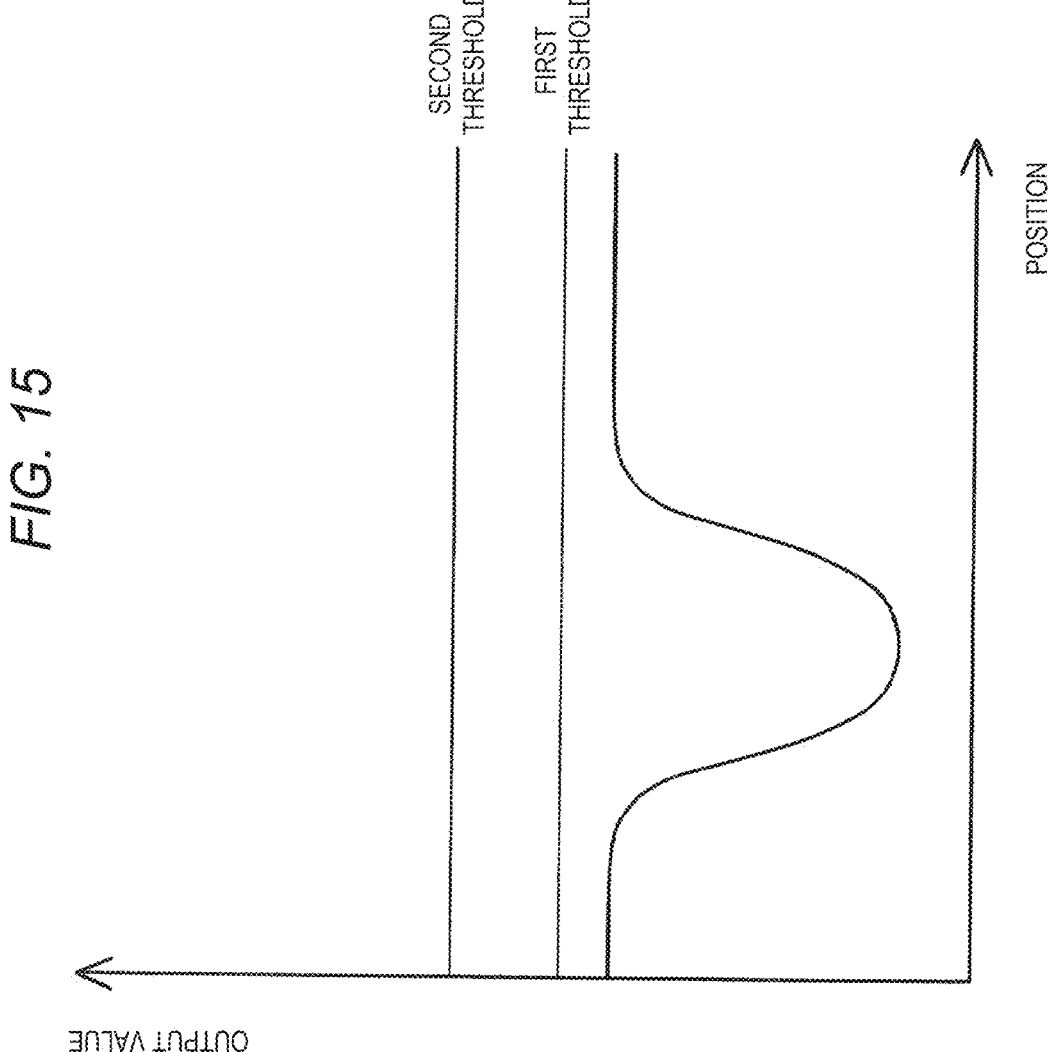
FIG. 15 is a graph illustrating a relation between the position of the first detection unit and the output value at the time of the detection of the detection target portion by the first detection unit and is a graph in the case in which the output value of the light reception amount of the first detection unit is smaller than when the output value is proper.
Figure 16:
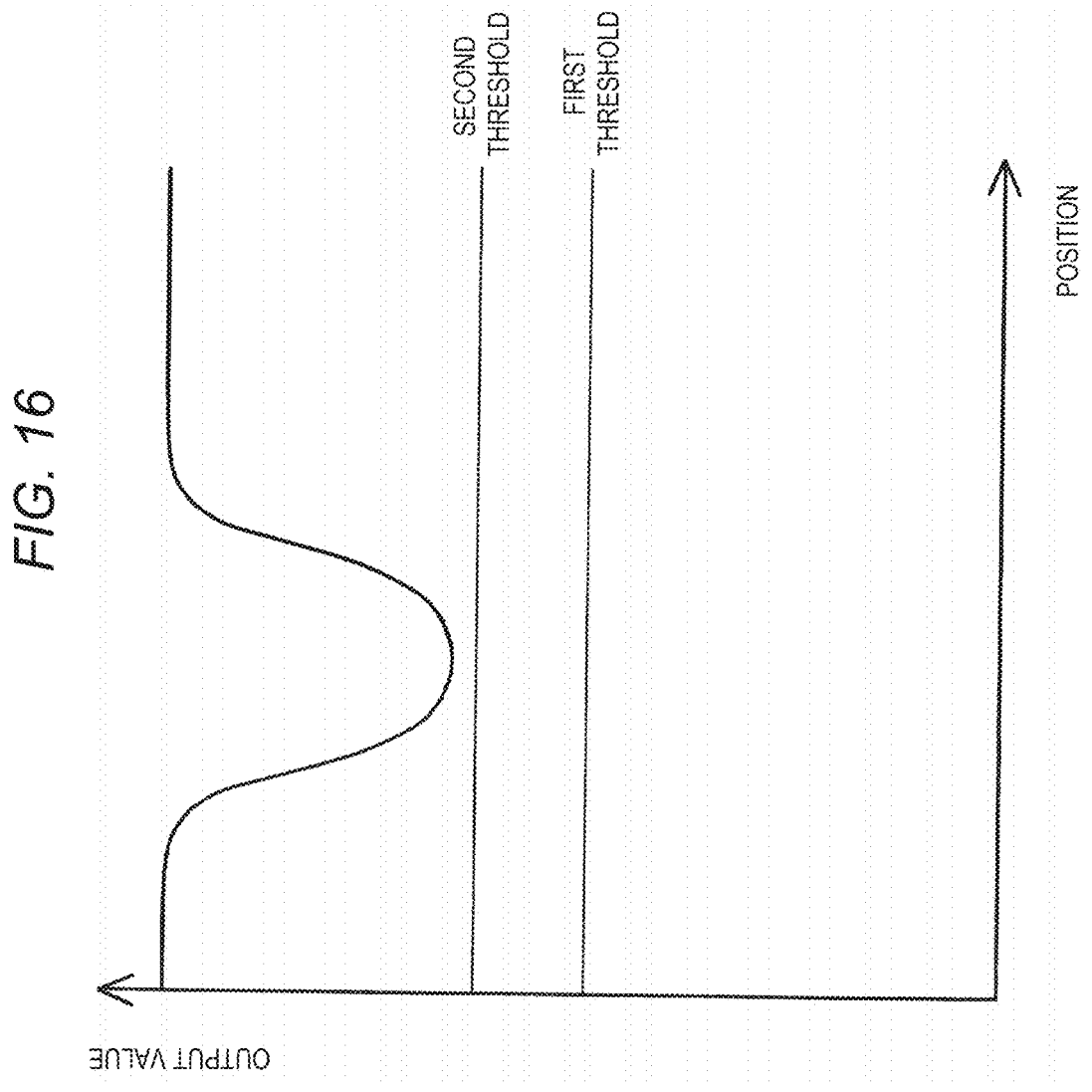
FIG. 16 is a graph illustrating the relation between the position of the first detection unit and the output value at the time of the detection of the detection target portion by the first detection unit and is a graph in the case in which the output value of the light reception amount of the first detection unit is larger than when the output value is proper.

As explained above, in the colorimetric apparatus 1 in the present example, it is possible to execute, according to the control of the control unit 400, a detection operation for detecting the black frames 12 using the front side sensor 37 and the rear side sensor 38, which are the optical detection units capable of detecting the black frames 12 by projecting and receiving light. Here, for example, when the entire output values of the light reception amounts of the front side sensor 37 and the rear side sensor 38 at the time when the carriage 30 straddles the black frames 12 in the detection operation for the black frames 12 as represented by FIG. 15, for example, are smaller than a first threshold, the colorimetric apparatus 1 in the present example can execute, according to the control of the control unit 400, a retry operation of increasing a light projection amount and executing the detection operation for the black frames 12 again. For example, when an entire output value of light reception amounts of the front side sensor 37 and the rear side sensor 38 at the time when the carriage 30 straddles the black frames 12 in the detection operation for the black frames 12 as represented by FIG. 16 are larger than a second threshold, the colorimetric apparatus 1 in the present example can execute, according to the control of the control unit 400 a retry operation of reducing the light projection amount and executing the detection operation for the black frames 12 again. When the retry operation is executed according to the control of the control unit 400, the colorimetric apparatus 1 in the present example can grasp the position of the color chart 10 on the support surface 41*a* based on a detection result in the retry operation and measure the colors of the color patches 11 with the colorimeter 100.

For this reason, when it is difficult to detect the black frames 12 with the front side sensor 37 and the rear side sensor 38 in the detection operation, the colorimetric apparatus 1 in the present example executes the detection operation again under a condition in which the black frames 12 are easily detected by the front side sensor 37 and the rear side sensor 38 and executes a color measurement operation based on a result of the detection. For this reason, it is possible to suitably detect the black frames 12 with the front side sensor 37 and the rear side sensor 38 without preparing a detection condition setting pattern or the like anew. It is possible to suitably grasp the position of the color chart 10. Therefore, it is possible to prevent a defect from occurring when the colors of the color patches 11 are measured. Note that, as explained above, in the present example, the colorimeter 100 includes, as the control unit 400, the main board 52 and the control unit 130 provided in the colorimeter 100. Here, the main board 52 may determine or the control unit 130 may determine executability of the retry operation.

Next, a determination flow for executability of the retry operation in a colorimetric method performed using the colorimetric apparatus 1 in the present example is explained with reference to FIG. 14. The flowchart represented by FIG. 14 corresponds to a detection loop for the black frames 12. As explained above, the colorimetric apparatus 1 in the present example executes the detection operation for the black frames 12 at eight positions. Specifically, the eight positions are eight positions in total including two positions across the center position PE and the center position PH corresponding to execution positions of a detection operation for the black frame 12*a*, two positions across the center position PI and the center position PJ corresponding to execution positions of a detection operation for the black frame 12*b*, two positions across the center position PK and the center position PL corresponding to execution positions of a detection operation for the black frame 12*c*, and two positions across the center position PM and the center position PN corresponding to execution positions of a detection operation for the black frame 12*d*. Therefore, the detection loop for the black frames 12 in the flowchart represented by FIG. 14 is a loop of eight times.

Figure 14:
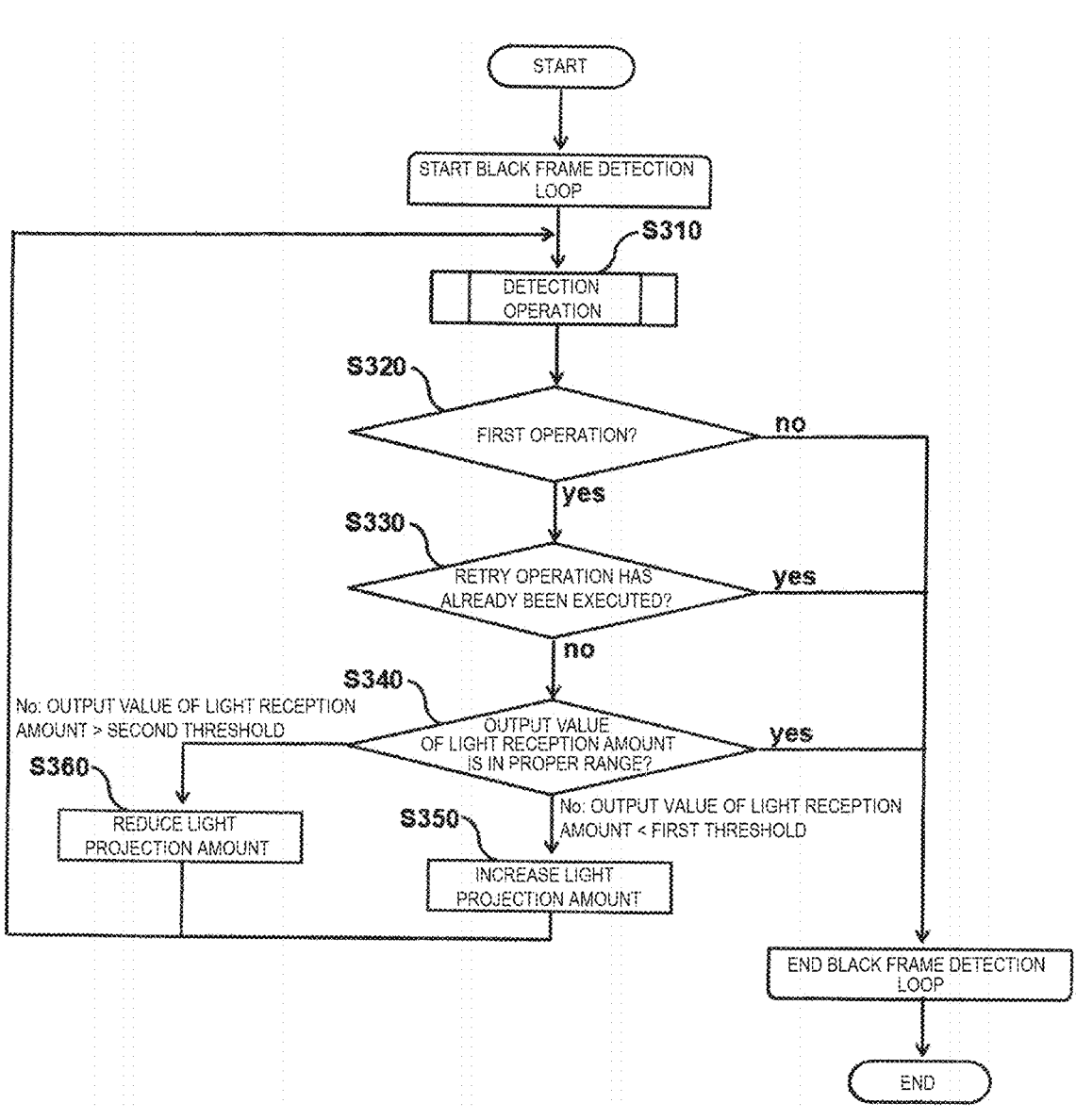
FIG. 14 is a flowchart illustrating a flow of executability of a retry operation for executing a detection operation for the detection target portion again in the colorimetric method performed using the colorimetric apparatus according to the example of the present disclosure.

When the flowchart represented by FIG. 14 is started, first, in step S310, the control unit 400 performs a detection operation for the black frames 12. This step corresponds to, for example, step S120 and step S130 of the flowchart of FIG. 11 for detecting the center position PE of the black frame 12*a* and corresponds to the operation of detecting the center position of the black frames 12.

Next, in step S320, the control unit 400 determines whether the detection operation in step S310 is a first detection operation in the detection unit. The determination is performed by each of the rear side sensor 38 and the front side sensor 37. As explained above, in the colorimetric apparatus 1 in the present example, the rear side sensor 38 detects the center position PE and the center position PH of the black frame 12*a*, the center position PK and the center position PL of the black frame 12*c*, and the center position PM and the center position PN of the black frame 12*d* and the front side sensor 37 detects the center position PI and the center position PJ of the black frame 12*b*. The first detection operation is a detection operation for the center position PE of the black frame 12*a* when the detection operation is executed by the rear side sensor 38 in step S310 and is a detection operation for the center position PI of the black frame 12*b* when the detection operation is executed by the front side sensor 37 in step S310. When determining in step S320 that the detection operation is the first detection operation, the control unit 400 proceeds to step S330. When determining in step S320 that the detection operation is not the first detection operation, the control unit 400 ends the determination flow for executability of the retry operation without executing the retry operation.

In step S330, the control unit 400 determines whether a retry operation has already been executed. Note that this determination is also performed by each of the rear side sensor 38 and the front side sensor 37. When determining in step S330 that the retry operation has not been executed, the control unit 400 proceeds to step S340. When determining in step S320 that the retry operation has already been executed, the control unit 400 ends the determination flow for executability of the retry operation without further executing the retry operation.

In step S340, the control unit 400 determines whether an output value of a light reception amount is within a proper range. A case in which the output value of the light reception amount is within the proper range corresponds to a case in which the output value crosses a threshold, for example, as represented by the graph of FIG. 13. Note that the threshold in the graph of FIG. 13 can be regarded as either the first threshold or the second threshold in the graph of FIG. 15 and the graph of FIG. 16. In the graph of FIG. 15 and the graph of FIG. 16, the first threshold and the second threshold have different values. However, the first threshold and the second threshold may have the same value. When determining in step S340 that the output value of the light reception amount is within the proper range, the control unit 400 ends the determination flow of executability of the retry operation without further executing the retry operation.

On the other hand, when the output value of the light reception amount is not within the appropriate range in step S340 and the entire output value of the light reception amount is smaller than the first threshold as represented by the graph of FIG. 15, the control unit 400 proceeds to step S350. Then, in step S350, the control unit 400 increases the setting value of the light projection amount and returns to step S310. Here, a flow of returning from step S350 to step S310 corresponds to the retry operation.

When the output value of the light reception amount is not within the proper range in step S340 and the entire output value of the light reception amount is larger than the second threshold as represented by the graph of FIG. 16, the control unit 400 proceeds to step S360. Then, in step S360, the control unit 400 reduces the set value of the light projection amount and returns to step S310. Here, a flow returning from step S360 to step S310 also corresponds to the retry operation.

When executing the retry operation according to the control of the control unit 400, the colorimetric apparatus 1 in the present example executes the detection operation for the black frames 12 again at the same position as the execution position of the detection operation for the black frames 12 before the retry operation. For example, when executing the retry operation concerning the center position PE of the black frame 12a, the measurement apparatus 1 detects the center position PE by moving again from the position PA to the position PB. By detecting the black frames 12 again at the same position in this way, conditions other than the light projection amount can remain the same and the possibility that the black frames 12 can be detected increases. Note that the "same position as the execution position of the detection operation" means that the position only has to be substantially the same position and does not need to be completely the same position. When executing the retry operation, the colorimetric apparatus 1 may execute the detection operation again at a position different from the execution position of the detection operation before the retry operation. However, it is preferable that the position is a position close to the execution position of the detection operation before the retry operation.

Further, when a plurality of detection target portions are present in the colorimetric object and the detection operation is executed at a plurality of positions as in the color chart 10 represented by FIG. 12, as represented by step S320 of the flowchart of FIG. 14, the colorimetric apparatus 1 in the present example is capable of executing, according to the control of the control unit 400, the retry operation only for a detection target portion for which the detection operation is first executed. For example, when it is difficult to detect the detection target portion with the detection unit because of a use environment of the colorimetric apparatus 1, it is often highly likely that the detection target portion can be detected if the retry operation is performed on one detection unit in one place. For this reason, the colorimetric apparatus 1 in the present example can suitably detect the detection target portion with the detection unit while reducing a time required for the retry operation.

As represented by the center position PE and the center position PH of the black frame 12a, the center position PI and the center position PJ of the black frame 12b, the center position PK and the center position PL of the black frame 12c, the center position PM and the center position PN of the black frame 12d, and the like in FIG. 12, the colorimetric apparatus 1 in the present example executes the detection operation in two places across the midpoint C in the extending direction of each of the black frames 12. In other words, the colorimetric apparatus 1 in the present example executes, according to the control of the control unit 400, the detection operation at least in two places across the center of the black frames 12 in the direction intersecting the moving direction of the carriage 30 in the detection operation. By executing the detection operation at a plurality of places across the center of the detection target portion in this way, it is possible to increase detection accuracy of the detection target portion by the detection unit.

In the colorimetric apparatus 1 in the present example, as represented by FIG. 4, the carriage 30 includes the support unit 310 that supports the colorimeter 100, the support unit 310 including the opening 302a that exposes the colorimetric surface 122 of the colorimeter 100 from the carriage 30 in a state in which the colorimeter 100 is supported by the support unit 310. The carriage 30 includes, as the detection units, the rear side sensor 38 serving as the first detection unit and the front side sensor 37 serving as the second detection unit disposed across the opening 302a. Here, the control unit 400 is capable of causing each of the rear side sensor 38 and the front side sensor 37 to execute a retry operation. Specifically, as explained above, when causing the rear side sensor 38 to execute the retry operation, the control unit 400 is capable of causing the rear side sensor 38 to retry the detection operation for the center position PE and, when causing the front side sensor 37 to execute the retry operation, the control unit 400 is capable of causing the front side sensor 37 to retry the detection operation for the center position PI.

With the configuration in which the first detection unit and the second detection unit are provided across the opening 302a as in the colorimetric apparatus 1 in the present example, for example, it is possible to narrow a movement range of the carriage 30 by, for example, executing the detection of each of the plurality of detection target portions with, of the first detection unit and the second detection unit, a detection unit closer to the detection target portion. Consequently, it is possible to prevent the colorimetric apparatus 1 from increasing in size. Further, by causing each of the first detection unit and the second detection unit to execute the retry operation as in the colorimetric apparatus 1 in the present example, for example, it is possible to suitably detect each of the plurality of detection target portions.

When a plurality of black frames 12 are present in the color chart 10 and the detection operation is executed at a plurality of positions by each of the rear side sensor 38 and the front side sensor 37, as represented by the flowchart of FIG. 14, the colorimetric apparatus 1 in the present example is capable of executing, according to the control of the control unit 400, the retry operation only for the black frame 12 for which the detection operation is executed first in each of the rear side sensor 38 and the front side sensor 37. Specifically, as explained above, when causing the rear side sensor 38 to execute the retry operation, the colorimetric apparatus 1 is capable of causing the rear side sensor 38 to retry the detection operation for the black frame 12*a* and, when causing the front side sensor 37 to execute the retry operation, the colorimetric apparatus 1 is capable of causing the front side sensor 37 to retry the detection operation for the black frame 12*b*. For this reason, the colorimetric apparatus 1 in the present example can suitably detect the detection target portion with the first detection unit and the second detection unit while reducing a time required for the retry operation.

The colorimetric apparatus 1 in the present example is capable of receiving input of information concerning a size of the color chart 10 from the user via, for example, the operation unit 220 of the PC 200. In other words, the control unit 400 of the colorimetric apparatus 1 in the present example is capable of receiving the information concerning the size of the color chart 10. The colorimetric apparatus 1 in the present sets detection operation execution positions of the black frames 12 based on the size of the color chart 10 received by the control unit 400 and is capable of executing a detection operation for the black frames 12. For this reason, the colorimetric apparatus 1 in the present example can efficiently execute the detection operation for colorimetric objects of various sizes. Note that, as explained above, in the colorimetric apparatus 1 in the present example, the color chart 10 is set on the support surface 41*a* with the corners of the color chart 10 aligned with the set position display portion 41 illustrated in FIG. 2. The control unit 400 calculates a position of each of the black frames 12 with reference to the position of the set position display portion 41 based on the information concerning the size of the color chart 10.

The present disclosure is not limited to the examples explained above and can be implemented in various configurations without departing from the gist of the present disclosure. For example, the colorimetric apparatus 1 in the present example is configured to measure a color of a colorimetric object in a state in which the colorimetric apparatus 1 is in contact with the colorimetric object but may be applied to a configuration in which the colorimetric apparatus 1 measures the color of the colorimetric object in a state in which the colorimetric apparatus 1 is not in contact with the colorimetric object. For example, technical features in the examples corresponding to technical features in the aspects described in the summary can be substituted and combined as appropriate in order to solve a part or all of the problems described above or in order to achieve a part or all of the effects described above. The technical features can be deleted as appropriate unless described as essential technical features in the present specification.

What is claimed is:

1. A colorimetric apparatus comprising:
   a support base configured to support, on a support surface, a colorimetric object on which a patch for color measurement and a detection target portion for detecting a position are formed;
   a colorimeter configured to measure a color of the patch;
   a carriage configured to support the colorimeter and movable in a first direction along the support surface and a second direction facing the support surface;
   a movement mechanism unit configured to move the carriage on the support base in a third direction extending along the support surface and intersecting the first direction;

20 an optical detection unit provided in the carriage and configured to project and receive light to thereby detect the detection target portion; and
   a control unit, wherein
   the detection unit detects, in a detection operation for detecting the detection target portion, the detection target portion based on a change in an output value of a light reception amount at a time when the carriage moves in the first direction or the third direction to straddle the detection target portion, and
   the control unit executes a retry operation for increasing a light projection amount and executing the detection operation again when the entire output value of the light reception amount of the detection unit at the time when the carriage straddles the detection target portion in the detection operation is smaller than a first threshold, reduces the light projection amount and executes the retry operation when the entire output value of the light reception amount of the detection unit at the time when the carriage straddles the detection target portion in the detection operation is larger than a second threshold, and grasps a position of the colorimetric object on the support surface based on a detection result in the retry operation when the retry operation is executed and measures the color of the patch with the colorimeter.

2. The colorimetric apparatus according to claim 1, wherein, when executing the retry operation, the control unit executes the detection operation again at the same position as an execution position of the detection operation before the retry operation.

3. The colorimetric apparatus according to claim 1, wherein, when there are a plurality of the detection target portions in the colorimetric object and the detection operation is executed at a plurality of positions, the control unit executes the retry operation only on the detection target portion for which the detection operation is executed first.

4. The colorimetric apparatus according to claim 1, wherein the control unit executes the detection operation at least in two places across a center of the detection target portion in a direction intersecting a moving direction of the carriage in the detection operation.

5. The colorimetric apparatus according to claim 1, wherein
   the carriage includes: a support unit configured to support the colorimeter, the support unit including an opening that exposes a color measurement unit of the colorimeter from the carriage in a state in which the colorimeter is supported by the support unit; and a first detection unit and a second detection unit that are the detection unit and provided across the opening interposed, and
   the control unit causes each of the first detection unit and the second detection unit to execute the retry operation.

6. The colorimetric apparatus according to claim 5, wherein, when a plurality of detection target portions are present in the colorimetric object and each of the first detection unit and the second detection unit executes the detection operation at a plurality of positions, the control unit executes the retry operation only for the detection target portion for which the detection operation is executed first in each of the first detection unit and the second detection unit.

7. The colorimetric apparatus according to claim 1, wherein the control unit receives information concerning a size of the colorimetric object, sets a detection operation execution position of the detection target portion based on the size of the colorimetric object, and executes the detection operation.

8. A colorimetric method for a colorimetric apparatus including:

a support base configured to support, on a support surface, a colorimetric object on which a patch for color measurement and a detection target portion for detecting a position are formed;

a colorimeter configured to measure a color of the patch;

a carriage configured to support the colorimeter and movable in a first direction along the support surface and a second direction facing the support surface;

a movement mechanism unit configured to move the carriage on the support base in a third direction extending along the support surface and intersecting the first direction; and an optical detection unit provided in the carriage and configured to project and receive light to thereby detect the detection target portion, the detection unit detecting, in a detection operation for detecting the detection target portion, the detection target portion based on a change in an output value of a light reception amount at a time when the carriage moving in the first direction or the third direction to straddle the detection target portion, the colorimetric method comprising:

executing a retry operation for increasing a light projection amount and executing the detection operation again when the entire output value of the light reception amount of the detection unit at the time when the carriage straddles the detection target portion in the detection operation is smaller than a first threshold, reducing the light projection amount and executing the retry operation when the entire output value of the light reception amount of the detection unit at the time when the carriage straddles the detection target portion in the detection operation is larger than a second threshold, and grasping a position of the colorimetric object on the support surface based on a detection result in the retry operation when the retry operation is executed and measuring the color of the patch with the colorimeter.

\* \* \* \* \*